United States Patent
Yan et al.

(10) Patent No.: US 7,067,795 B1
(45) Date of Patent: Jun. 27, 2006

(54) METHODS AND SYSTEMS FOR DYNAMIC CONTROL OF POLARIZATION OF AN OPTICAL SIGNAL

(75) Inventors: Lianshan Yan, Los Angeles, CA (US); X. Steve Yao, Diamond Bar, CA (US); Yongqiang Shi, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 99 days.

(21) Appl. No.: 10/678,592

(22) Filed: Oct. 2, 2003

Related U.S. Application Data

(60) Provisional application No. 60/416,299, filed on Oct. 3, 2002.

(51) Int. Cl.
*G02F 1/01* (2006.01)
*H01J 40/14* (2006.01)

(52) U.S. Cl. ........................... 250/225; 359/238

(58) Field of Classification Search ............... 250/225, 250/216, 205, 206; 356/368, 453; 359/238, 359/239, 246
See application file for complete search history.

(56) References Cited

U.S. PATENT DOCUMENTS

| | | | | |
|---|---|---|---|---|
| 4,129,357 A | * | 12/1978 | Frosch et al. | 359/497 |
| 5,191,387 A | * | 3/1993 | Ichikawa et al. | 356/34 |
| 5,243,455 A | * | 9/1993 | Johnson et al. | 349/18 |
| 5,247,176 A | * | 9/1993 | Goldstein | 250/338.1 |
| 6,100,944 A | * | 8/2000 | Sharp et al. | 349/19 |
| 6,576,886 B1 | | 6/2003 | Yao | |

* cited by examiner

*Primary Examiner*—Georgia Epps
*Assistant Examiner*—Kevin Wyatt
(74) *Attorney, Agent, or Firm*—Fish & Richardson P.C.

(57) ABSTRACT

Techniques and systems for dynamically controlling polarization of an optical signal by using various feedback controls, and by combining both feed-forward and feedback controls. Various dynamic control algorithms for such systems and other optical systems have been disclosed.

20 Claims, 30 Drawing Sheets

V1

(max=142V)

V2

(max=124V)

V

METHODS AND SYSTEMS FOR DYNAMIC CONTROL OF POLARIZATION OF AN OPTICAL SIGNAL

This application claims the benefit of U.S. Provisional Application No. 60/416,299 entitled METHODS AND SYSTEMS FOR DYNAMIC CONTROL OF POLARIZATION OF AN OPTICAL SIGNAL and filed Oct. 3, 2002, which is incorporated herein by reference in its entirety as part of this application.

TECHNICAL FIELD

This application relates to optical polarization, and more specifically, to techniques and systems for controlling a state of polarization of an optical signal.

BACKGROUND

Various optical devices and systems can be sensitive to the state of polarization of an optical signal to be processed or transmitted. For example, certain coherent optical processing may require a match between the states of polarization of two separate optical beams when the two beams are superposed. For another example, a birefringent optical element may attenuate an optical signal differently when the polarization of the signal forms different angles with respect to a given principal axis of polarization of the element. An optical amplifier with a saturable gain medium may also produce a polarization-dependent gain when a polarization component with a high intensity saturates the gain medium and hence experiences an optical gain less than that of another, weaker polarization component. Furthermore, certain optical modulators may produce different modulation depths on optical signals with different polarizations. Semiconductor electro-absorption modulators and electro-optical modulators based on birefringent crystals such as lithium niobate are examples of such modulators. Hence, it is generally desirable to control the polarization of an optical signal in those and other polarization-sensitive devices and systems.

The polarization of an optical signal may not be static but dynamically vary with time in some optical systems due to various fluctuations or changes in some parts of the systems such as light sources, optical components, and optical transmission media. For example, some optical fibers may be birefringent to exhibit different refractive indices for different polarizations. Typical causes for this fiber birefringence include, among others, imperfect circular cores, and unbalanced stress in a fiber along different transverse directions. Fluctuations in local temperature and stress along a fiber line, therefore, may randomly change the axis of birefringence of the optical fiber at different locations. The polarization of light transmitting through such a fiber, therefore, may also fluctuate with time and cause polarization-mode dispersion (PMD) in optical signals with two orthogonal principal polarization states.

Accordingly, it may be desirable that a polarization control mechanism be dynamic so that it may change its control in response to any variation in the input polarization of light and therefore maintain or set the output polarization at a desired state. Some dynamic polarization control devices implement an adjustable polarization module that manipulates the polarization of light, and a polarization analyzer that measures any deviation of the actual output polarization from the polarization module from a desired output polarization. The adjustable polarization module may include multiple adjustable polarization elements, e.g., rotatable waveplates or adjustable fiber squeezers engaged to a fiber, to control the output polarization based on adjustable optical birefringence. A feedback control loop may be used to control the polarization elements in the adjustable polarization module to correct any variations in the input polarization based on the measured deviation from the polarization analyzer.

SUMMARY

The present disclosure includes a control mechanism for dynamically controlling the multiple polarization elements in the adjustable polarization module. In one implementation, only a feedback control is applied to the multiple polarization elements in response to a feedback signal. In another implementation, a feed-forward control and a feedback control are combined.

BRIEF DESCRIPTION OF THE DRAWINGS

FIGS. 24 through 42B are exemplary applications for feedback polarization control.

DETAILED DESCRIPTION

Figure 1:
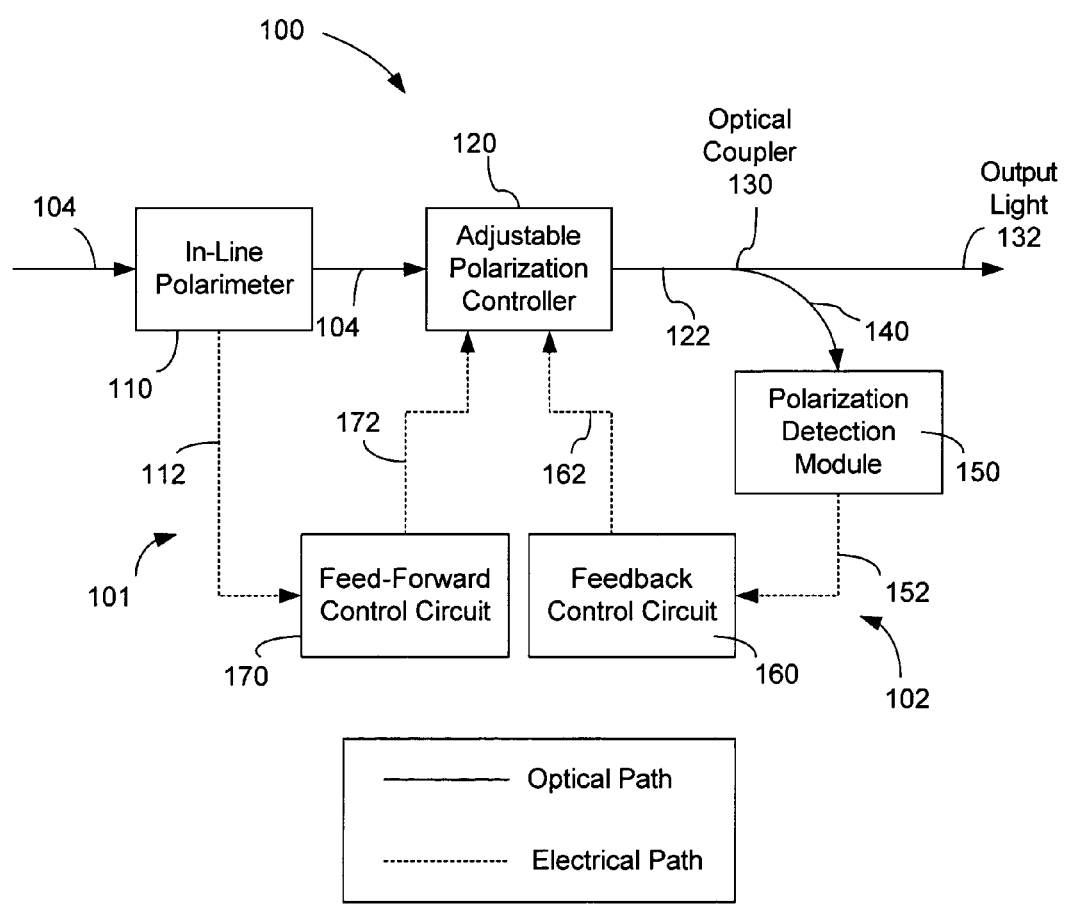
FIG. 1 shows an exemplary dynamic polarization control system that combines a feedforward control loop and a feedback control loop.

The devices, systems, and techniques for controlling polarizations described here generally use two different control designs. The first control design simultaneously uses a feedforward control loop and a feedback control loop to dynamically control a polarization controlling device or system to achieve a desired output polarization. The second control design uses special polarization control devices and efficient feedback control loops without the feedforward control to achieve a high response speed and control accuracy that are generally difficult to achieve in conventional polarization control systems based on feedback loops.

This first control design is in part based on the recognition that, a feedback control alone may be inefficient or slow in controlling multiple polarization elements that operate in combination to control or maintain the output polarization at a desired polarization. Such a feedback control in some implementations relies on the output polarization produced by the multiple polarization elements to adjust the settings of the multiple polarization elements. In general, a setting in each polarization element may be adjustable only within a limited tuning range. Hence, as the input polarization drifts or fluctuates, the adjustment of one or more polarization elements may reach their respective limits in an attempt to maintain the output polarization at the desired state. When this occurs, an out-of-range polarization element must be reset to a setting within its tuning range and the combined configuration of the multiple polarization elements must be readjusted in order to lock the output polarization at the desired state.

Hence, the above resetting of one or more polarization elements in the feedback control can be a slow process and therefore, the output polarization may not be at the desired state during the reset period. This may be undesirable in a polarization-sensitive application where a component, device, or system may perform unsatisfactorily or even fail during the reset period.

It is further recognized that, the above drawback of the feedback control is partially due to the reactive nature of the feedback control. The feedback control does not have or does not respond to information on the input polarization received by the multiple polarization elements. Instead, it controls the polarization elements based on the output polarization to correct the error in the output polarization.

In recognition of the above, the first control design described in this application implements a feed-forward control and combines the feed-forward control and the feedback control to provide a highly-accurate and high-speed polarization control mechanism. This system may be configured to essentially eliminate the resetting of the polarization elements by using the feed-forward control to maintain the setting of each polarization element within its tuning range. In addition, the first control design may also be used to mitigate device inaccuracies such as hysteresis and device parameter drifts due to aging and environmental factors.

FIG. 1 shows an exemplary polarization control system 100 based on the first control design. An adjustable polarization controller 120 is used to receive an input optical signal 104 and to produce an output optical signal 122 at a desired polarization. The polarization controller 120 includes two or more adjustable polarization elements to modify the polarization of the input signal 104. Each polarization element may be optically birefringent and use its birefringence to modify the polarization of light passing therethrough. The polarization elements may be optically cascaded in series within the controller 120. A feed-forward control loop 101 and a feedback control loop 102 are used to control the polarization elements in the polarization controller 150.

The feed-forward control loop 101 includes an input polarization detection module 110 and a feed-forward control circuit 170. The polarization detection module 110 measures the state of the input polarization of the input optical signal 104. This module 110 may be an in-line polarimeter which transmits a received optical signal and measures its polarization at the same time without altering the input polarization. Alternatively, the module 110 may be a polarimeter that destroys the polarization upon measuring the polarization. Such a polarimeter may be coupled in the system out of the main optical path to receive a fraction of the input signal 104 by using an optical coupler or splitter in the path of the input beam 104 to tap the input signal 104 so that the majority of the input signal 104 continues to propagate to the polarization controller 120. The module 110 produces an electrical output signal 112 that indicates the state of input polarization of the input 104.

The feed-forward control circuit 170 is coupled to the module 110 to receive the signal 112. It may have a look-up table with different setting combinations for the polarization elements in the controller 120 that convert all possible states of polarization of the input signal 104 into one or more desired polarization states of the output 122. In each setting combination, the setting for each polarization element is within its corresponding tuning range with a sufficient room for adjustment. Preferably, the setting may be set at or near the middle point of the tuning range to provide a maximum tuning range. This look-up table may be stored in the feed-forward control circuit 170.

When the signal 112 is received from the module 112, the feed-forward control circuit 170 looks up the corresponding combination setting from the look-up table for converting the measured polarization indicated by the signal 112 into the desired polarization. A control command 172 to the polarization controller 120 is then generated by the circuit 170 to set the polarization elements in the polarization controller 120 according to the selected setting combination. The look-up table is predetermined based on calibration and is stored in the circuit 170. The feed-forward control circuit 170 does not need to perform complex computation. Hence, the feed-forward control loop 101 can quickly respond to the measurement in the signal 112 to properly set the multiple polarization elements in the controller 120.

The above operation of the feed-forward control loop 101 provides a coarse tuning mechanism for setting the polarization elements in the controller 120. The feed-forward control loop 101, however, does not know whether the polarization of the output signal 122 is in fact at the desired polarization. The feedback control loop 102 is designed to check the polarization of the output signal 122 and fine tunes the polarization elements to reduce any inaccuracy in the coarse setting produced by the feed-forward control loop 101 and any variations caused by fluctuations or drifts in the polarization of the input signal 104.

The feedback control loop 102 includes a polarization detection module 150 and a feedback control circuit 160. The polarization detection module 150 may be placed in or out of the path of the output signal 122. As illustrated, when the module 150 is placed out of the path of the signal 122, an optical coupler or splitter 130 may be used to tap a fraction of the output signal 122 to produce a monitor beam 140 as the input to the polarization detection module 150. A polarimeter or a polarization analyzer formed of a linear polarizer and a photodetector may be used as the module 150. A deviation of the polarization of the output signal 122 from the desired polarization is measured by the module 150 and is included in an error signal 152 to the feedback control circuit 160. The feedback control circuit 160 then initiates an adjustment routine to fine tune the settings of the polarization elements in the controller 120 to reduce that measured deviation.

In operation, the feed-forward control 101 resets the settings of the polarization elements in controller 120 whenever the input polarization changes based on the pre-determined look-up table. Hence, a polarization element under the control of the feed-forward control 101 can be kept within its tuning range without the need for resetting operation. The feedback control 102, on the other hand, may operate independently with respect to the feed-forward control 101 to fine tune the controller 120 and maintain the output polarization at the desired state.

Figure 2:
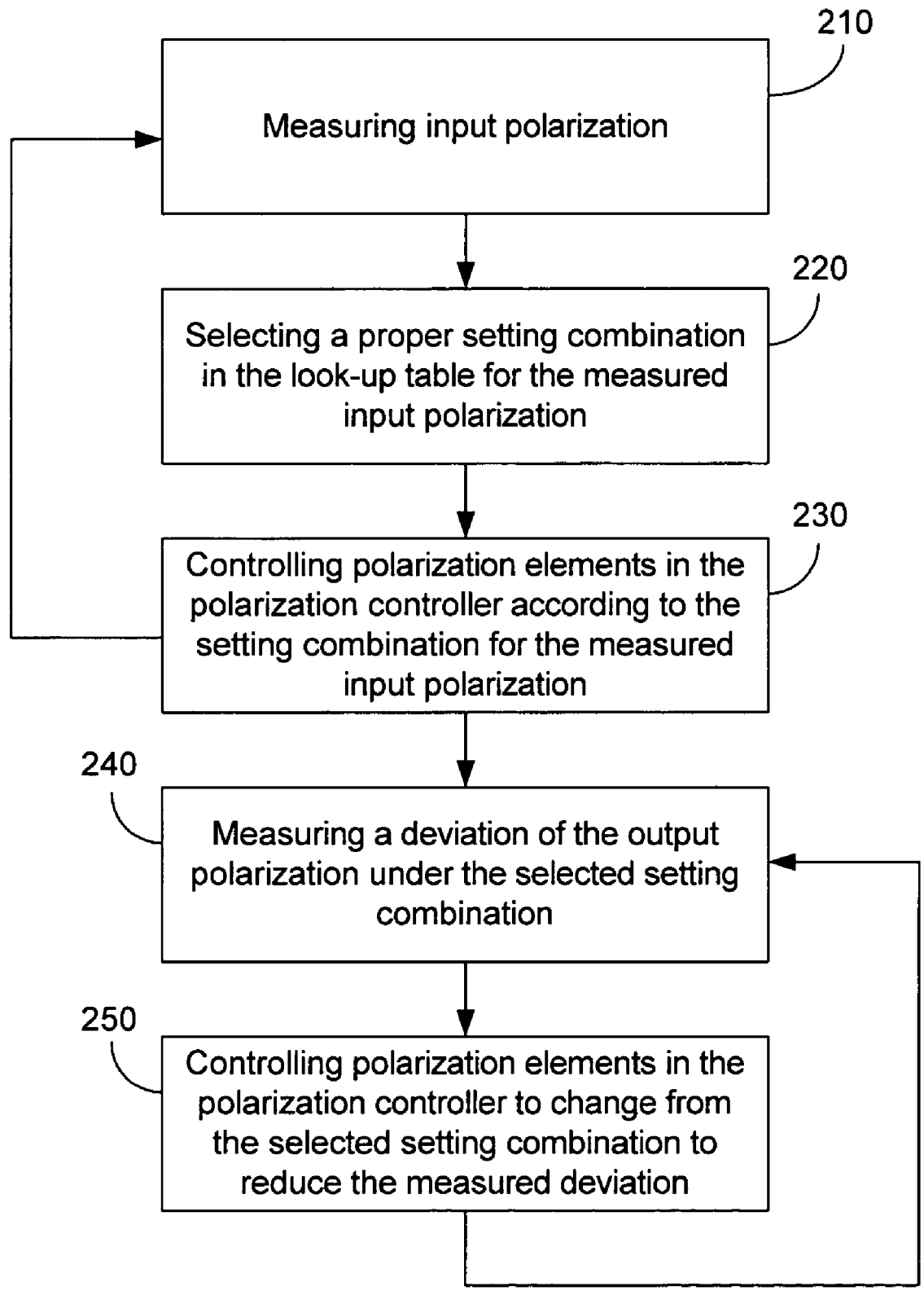
FIG. 2 shows one example of the operational flow of the system in FIG. 1.

FIG. 2 shows one implementation of the operational flow of the feed-forward control 101 and feedback control 102 shown in FIG. 1. At step 210, the input polarization is measured. Step 220 selects from a look-up table a proper predetermined setting combination of settings for the polarization elements in the controller 120 for producing a desired output polarization. In implementation, all polarization elements in the controller 120 may be adjusted to a predetermined setting combination based on the input polarization. Alternatively, only two polarization elements in the controller 120 may be set to a predetermined setting combination to control the polarization to the desired output and the remaining polarization elements may be controlled according to the polarization output of the whole controller 120 as shown in steps 240 and 250. At step 240, the output polarization from the controller 120 is measured and compared to the desired output polarization to determine the deviation. Based on this measured deviation of the output, all polarization elements in the controller 120 may be adjusted to change from the predetermined setting combination to reduce the measured deviation (step 250). When only part of the polarization elements in the controller 120 are designed to be adjusted based on the measured deviation in the output polarization, then only such designated polarization elements are adjusted in step 250 while settings of other polarization elements remain unchanged. The above feed-forward control based on the input polarization and the feedback control based on the output polarization operate collectively to control the output polarization.

Figure 3:
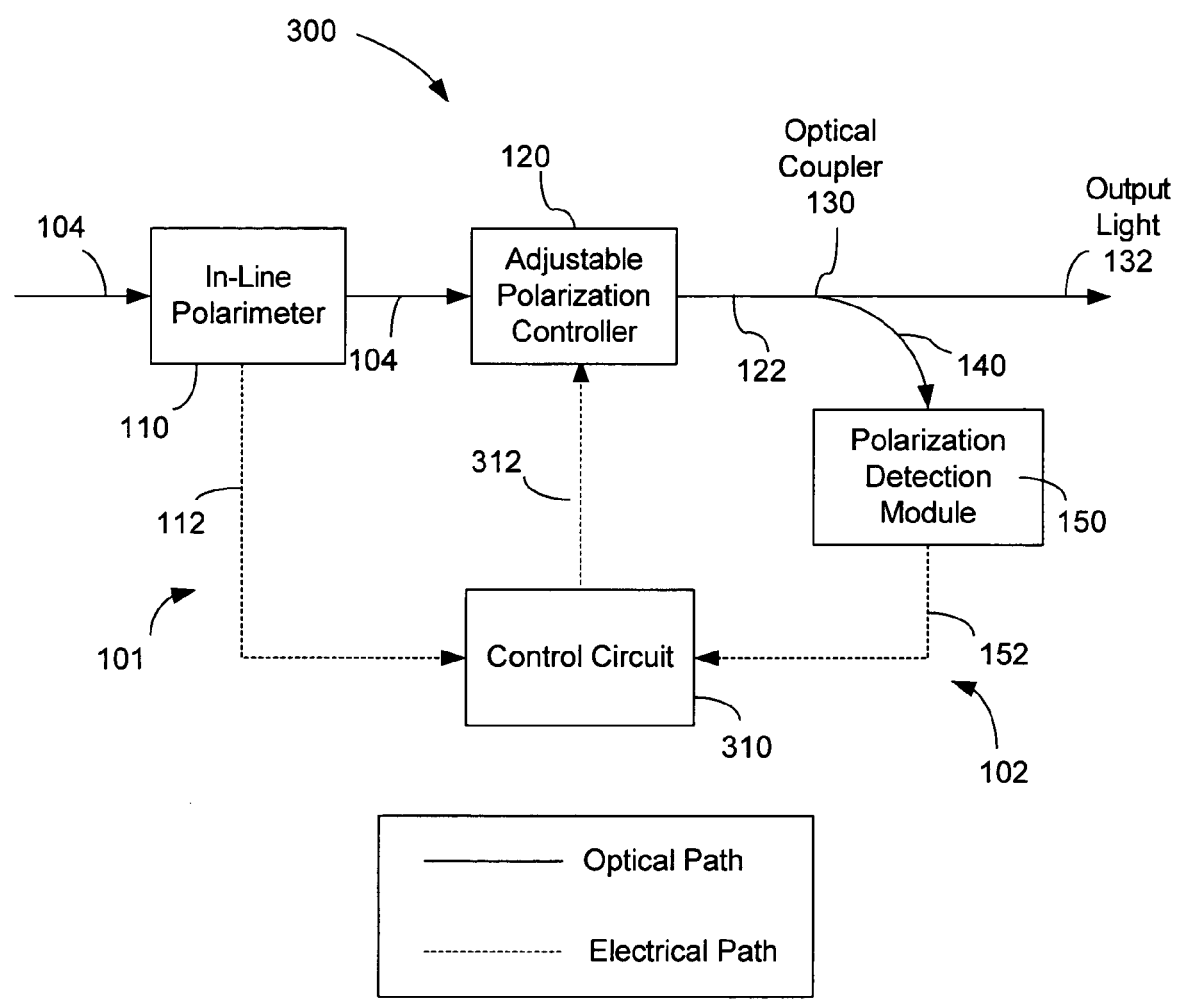
FIG. 3 shows another exemplary dynamic polarization control system that combines a feedforward control loop and a feedback control loop.

FIG. 3 shows an alternative system 300 where a control unit 300 is used to produce control signals 312 to different control elements in the polarization controller 120 based on the measured input polarization from the feedforward loop 101 and the measured output polarization from the feedback loop 102. Hence, different from the implementation in FIGS. 1 and 2 that use separate controls, the control unit 310 of the system 300 uses a control algorithm to directly compute each control signal to each adjustable control element in the controller 120 based on the measured input and output polarization states. That is, the control unit 310 combines the information from the measured input and output polarization states to produce a single control signal to each element in the controller 120 without two separate control signals 172 and 162 for each control element as in FIG. 1. An example of this design is described at the later part of this application.

Figure 4A:
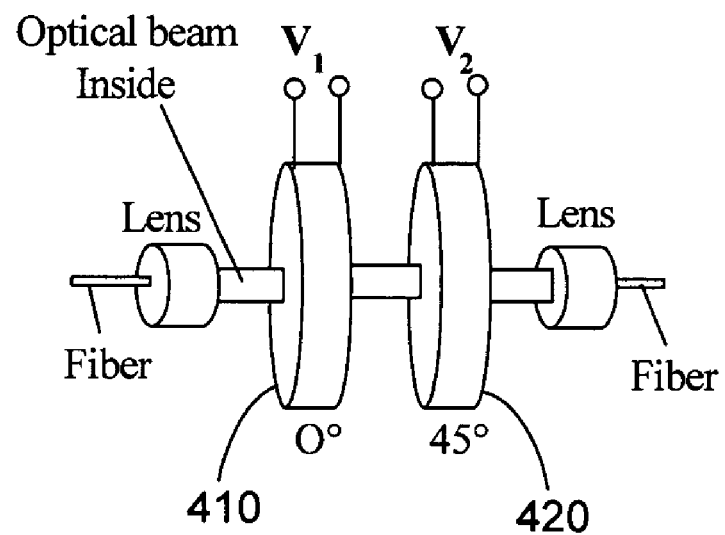
FIGS. 4A, 4B, 5A, and 5B show examples of a polarization controller.
Figure 4B:
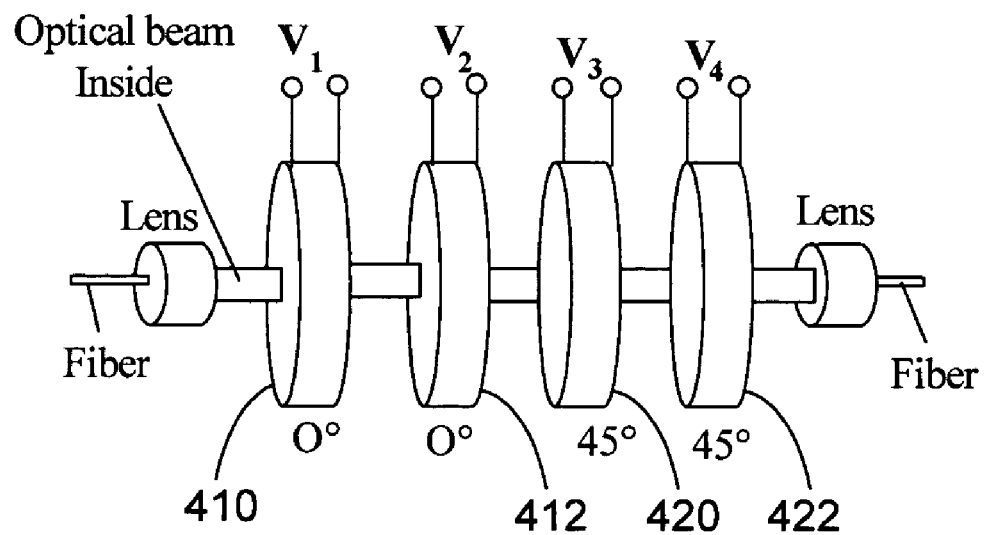

The multi-element polarization controller 120 in FIGS. 1 and 3 may be implemented in various configurations. FIGS. 4A through 5B show some examples. FIGS. 4A and 4B show implementations of the controller 120 having two or more adjustable polarization elements with fixed relative orientations and variable birefringences. FIG. 4A uses two adjustable polarization elements 410 and 420 with their principal polarizations at about 45 degrees relative to each other. The retardation values change in response to external control signals such as applied voltages V1 and V2, respectively. The directions of the same principal polarization axis such as the slow axis of the two waveplates 410 and 420 may be at 0 degree and 45 degree, respectively. Electro-optic materials and liquid crystals may be used. Two collimation lenses may be used to couple the system to input and output fibers.

Notably, these two waveplates 410 and 420 are sufficient to achieve all control operations in the systems shown in FIGS. 1 and 3, and other systems described in later sections of this application. This is possible because of the unique control algorithms described in this application. Hence, this design is much simpler than other systems using 3 or more adjustable polarization elements.

Each waveplate 410 or 420 has a limited operating range. Each single waveplate 410 or 420 may be replaced by two or more identically oriented waveplates to expand the operating range for each orientation. FIG. 4B shows one example where two waveplates 410 and 412 at 0 degree are sequentially placed in the optical path before two waveplates 420 and 422 at 45 degrees. Hence, the device in FIG. 4B has twice the tuning range as the device in FIG. 4C. Certainly, 3 or more waveplates may be added to further expand the tuning range. This design avoids a conventional 4-element design where the elements are sequentially arranged as 0 degree, 45 degrees, 0 degree, and 45 degrees and can simplify the control operations.

Figure 5A:
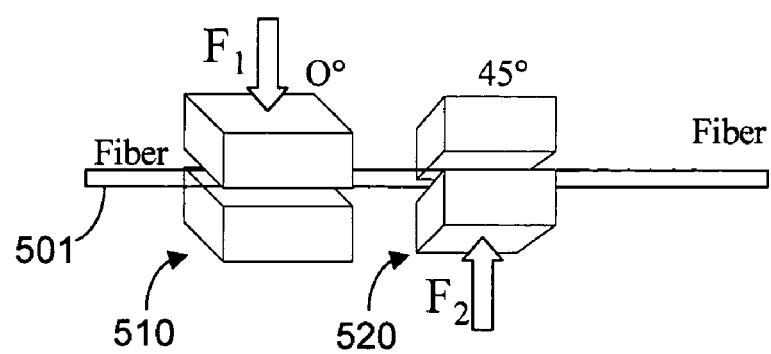
Figure 5B:
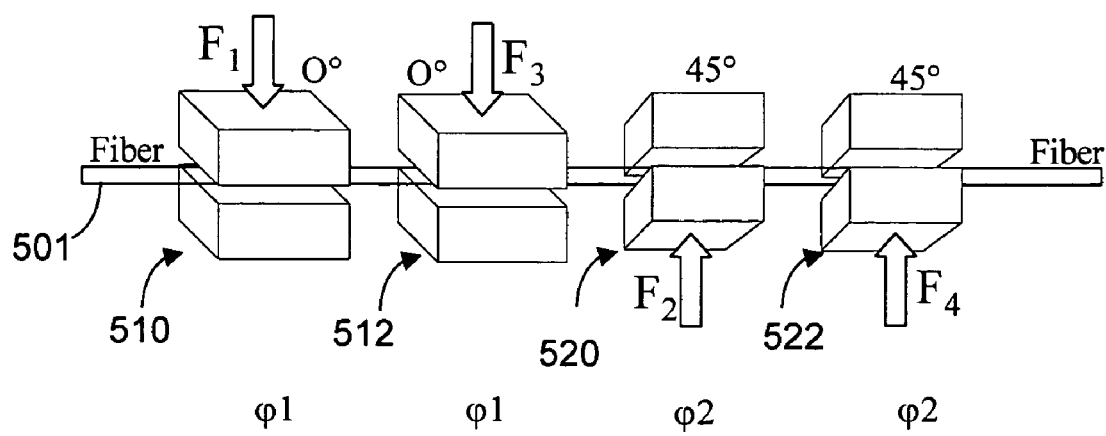

FIGS. 5A and 5B show an all-fiber implementations of the above design in FIGS. 4A and 4B. FIG. 5A show a fiber 501 is engaged to two fiber squeezers 510 and 520 whose squeezing directions are fixed at angles of 0 degree and 45 degrees, respectively. FIG. 5B shows an example corresponding to FIG. 4B, where two identically-oriented fiber squeezers 510 and 512, and 520 and 522, are used two expand the tuning range for each orientation. The pressure on each squeezer may be adjusted to change the retardation produced thereby. Each squeezer may include a PZT to press the fiber in response to an applied voltage. Such an all-fiber design may be used to reduce the optical insertion loss as compared to other designs and may be used to operate on light of different wavelengths.

Figure 6:
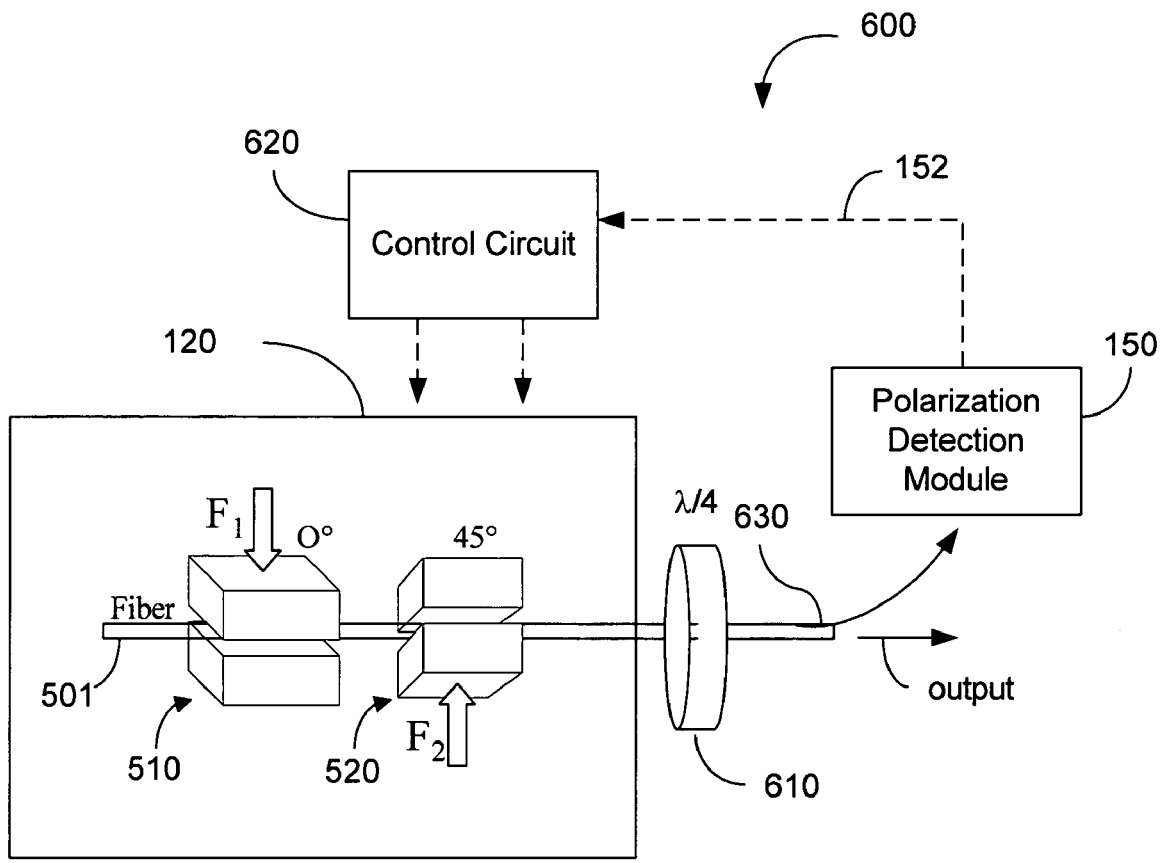
FIG. 6 shows an exemplary dynamic polarization control system that uses a feedback control loop without the feedforward control.

The above implementations of the adjustable polarization controller 120 can also be used in systems with only the feedback control without the feedforward control loop. FIG. 6 shows an example of such a polarization control system 600 based on the controller 120 shown in FIG. 5A. Each of the elements 510 and 520 may be replaced by two or more identically-oriented elements to increase the tuning range as mentioned above, or by the tunable wave plates shown in FIGS. 4A and 4B. Notably, a quarter wave plate 610 is placed in the output optical path of the controller 120 as part of the system 600. An optical splitter 630 may be used to split a fraction of the signal to an off-line polarization detection module 150 such as a polarimeter to measure the output polarization and to produce a signal 152. A control unit 620 processes the signal 152 to produce control signals V1 and V2 to the adjustable elements 510 and 520, respectively.

The following sections describe various dynamic control algorithms and techniques that may be used in the above-described systems and other optical systems. Control of polarization related effects is important due to the dynamic characteristics of the polarization in high-data-rate fiber systems. Many techniques for dynamic polarization optimization maximize the monitored optical power after the corresponding components where it is generally difficult to track the polarization status due to the uncertainty of the tracking direction. For example, sometimes the local minimum of power tracking appears or the control voltages of polarization controller are out of range. In the latter situation, reset or rewinding of the polarization control is often needed.

The Poincare sphere is an excellent display format for monitoring signal polarization changes, since all states of polarization (SOPs) can be represented on the sphere at the same time. This is accomplished by assigning each SOP its own specific point on the Poincare sphere. Points on the equator represent states of linear polarization, the poles represent right-hand and left-hand circular polarization, and other points on the sphere represent elliptical polarization.

Figure 7:
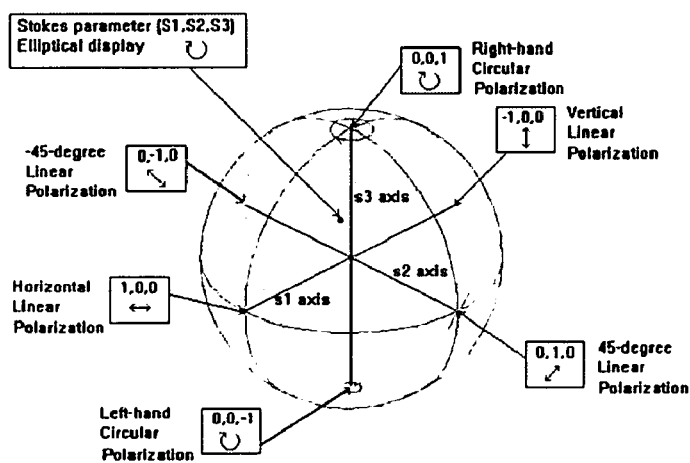
FIG. 7 shows polarization representation in a Poincare sphere.

FIG. 7 illustrates polarization states on the Poincare sphere using an elliptical display, a point on the Poincare sphere or a set of Stokes parameters. Each point on this Poincare sphere has a unique set of coordinates defined by the sphere's three-dimensional axes $S_1$, $S_2$ and $S_3$. A Stokes vector is a 4×1 real matrix of Stokes parameters ($S_0$, $S_1$, $S_2$, $S_3$) that completely describes the SOP of a light. Each element of the matrix is based upon measured power levels. $S_0$ is the average power of the entire light beam (I). $S_1$ is the difference in power between the horizontal and vertical linear polarization components of the beam ($I_0$–$I_{90}$). $S_2$ indicates the power difference between the +45-degree and −45-degree linear polarization ($I_{45}$–$I_{-45}$). $S_3$ is the power difference between the right hand (RCP) and left-hand circular (LCP) polarization ($I_{RCP}$–$I_{LCP}$). The Stokes vector has a magnitude equal to $(S_1^2+S_2^2+S_3^2)^{1/2}$ and originates from the center of the Poincare sphere. The three Stokes parameters can be normalized by the relative optical power values ($s_1=S_1/S_0$, $s_2=S_2/S_0$, $s_3=S_3/S_0$).

Referring to FIG. 6, the corresponding Stokes vector can be measured by the module 150. The control circuit 620 uses this information to track and align the input polarization states or SOP of the light with the desired polarization states. Using the normalized Stokes parameters measured from the polarimeter 150 ($s_0$, $s_1$, $s_2$, $s_3$, here $s_0$ is as same as $S_0$) as feedback control signals, the polarization states can be tracked and tuned by changing the control voltages adding on the two waveplates or PZT sections of fiber squeezers.

Figure 8:
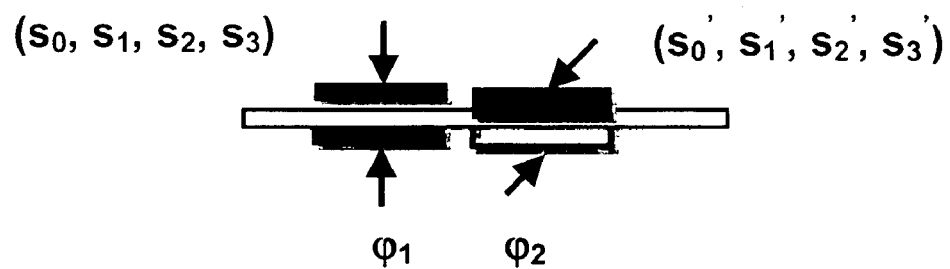
FIG. 8 shows a fiber polarization controller with two fiber squeezers.

FIG. 8 shows that two fiber squeezers driven by 2-PZTs in the polarization controller 120 can change the input SOP ($s_0$, $s_1$, $s_2$, $s_3$) to ($s_0'$, $s_1'$, $s_2'$, $_3'$). Assuming the phase delay induced by PZT1 and PZT2 are ($\phi_1$ and $\phi_2$, respectively, the following relation between the input and output SOP can be derived from the transformation matrix:

$$\begin{bmatrix} s_0' \\ s_1' \\ s_2' \\ s_3' \end{bmatrix} = \begin{bmatrix} 1 & 0 & 0 & 0 \\ 0 & \cos\varphi_2 & -\sin\varphi_1\sin\varphi_2 & -\cos\varphi_1\sin\varphi_2 \\ 0 & 0 & \cos\varphi_1 & -\sin\varphi_1 \\ 0 & \sin\varphi_2 & \sin\varphi_1\cos\varphi_2 & \cos\varphi_1\cos\varphi_2 \end{bmatrix} \begin{bmatrix} s_0 \\ s_1 \\ s_2 \\ s_3 \end{bmatrix}.$$

This suggests that that $s_2'$ is not a function of $\phi_2$, i.e. $s_2'$ will keep constant as the driving voltage on PZT2 ($V_2$) changes, thus the projection on the Poincare sphere will be a series of parallel circles with the central axis as $s_2$. Meanwhile, due to this character of the polarization controller, the output SOP can be traced by changing the driving voltages of the two PZTs ($V_1$ and $V_2$). On the other hand, it is very difficult to get a given linear SOP that is located at the "equator" of the Poincare sphere.

Referring to FIG. 6, the quarter wave plate 610 is used to solve the above dilemma. This quarter wave plate 610 can provide the coordinate rotation as follows:

$$\begin{bmatrix} s_0' \\ s_1' \\ s_2' \\ s_3' \end{bmatrix} = \begin{bmatrix} 1 & 0 & 0 & 0 \\ 0 & 1 & 0 & 0 \\ 0 & 0 & 0 & 1 \\ 0 & 0 & -1 & 0 \end{bmatrix} \begin{bmatrix} s_0 \\ s_1 \\ s_2 \\ s_3 \end{bmatrix}.$$

Figure 9:
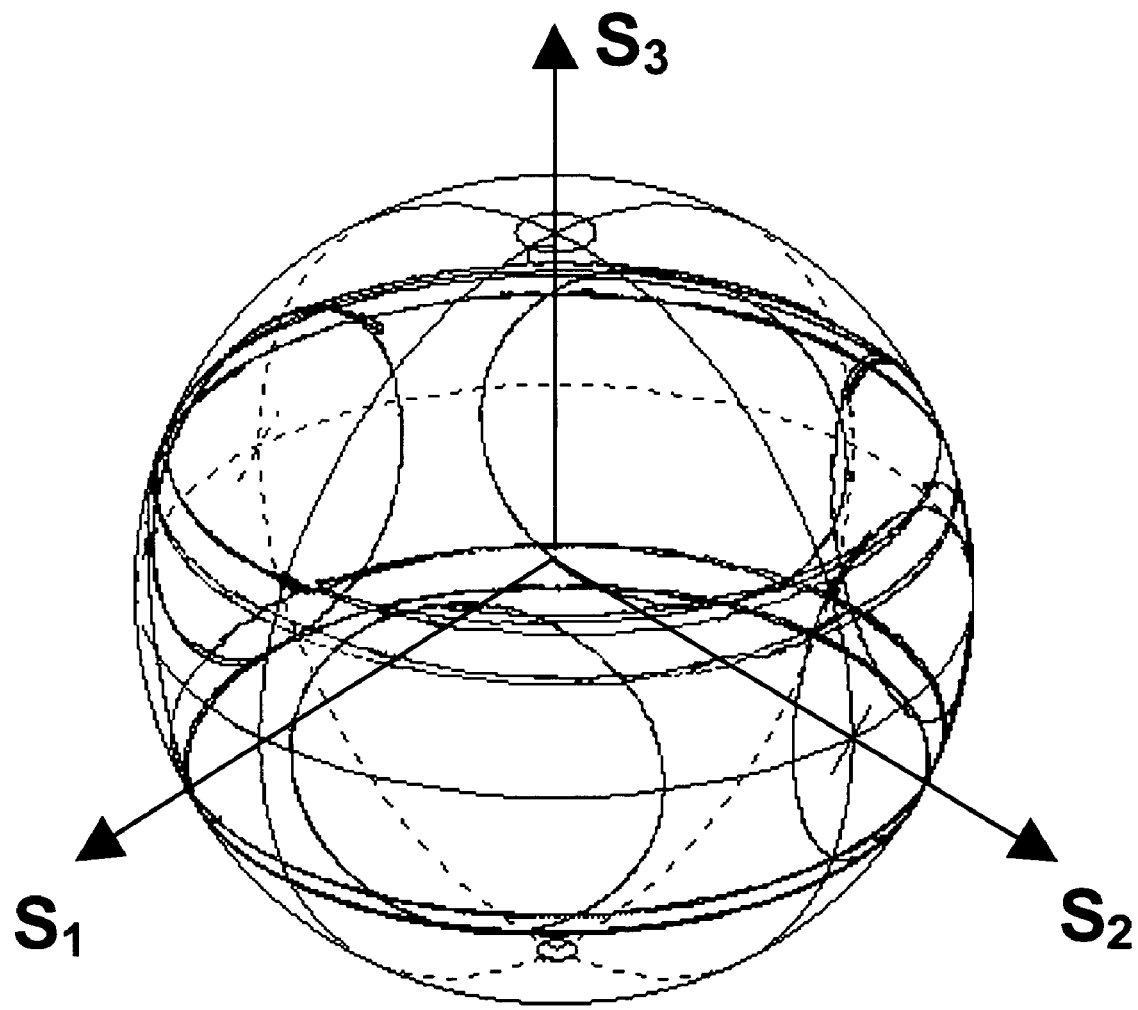
FIG. 9 shows polarization states in the controller in FIG. 8.

Using this method, the $s_2$ axis can be rotated to coincide with the original $s_3$ axis, therefore the series of circles paralleling to each other by varying the voltage of PZT2 will be parallel to the equator. It will make it easy to get a linear polarization state by just changing $V_2$ after we locate the output polarization on the equator by adjusting $V_1$, as shown in FIG. 9.

The system 600 in FIG. 6 also exhibits several other characteristics. For example, the cover range on the sphere depends on the input polarization state. Since we already rotated the coordinates, all the linear polarization states that lie on the equator can be covered unless some elliptical or circular polarization states are required which is rarely the case. Also, the traces of the second PZT are parallel to each other for different $V_1$, however, there is no apparent relation between the traces of the first PZT as we change $V_2$. The only confined factor is the size of these traces that also depend on the input polarization states.

The first approach is using feedback control after we gather the output SOP and compare with the desired one. Here all the connections through the paper are polarization maintaining or free space oriented. Since we know the trace of the second PZT that is parallel or coincide with the equator (after coordinates rotation using quarter wave plate), we can first try to move the output SOP from the initial state to a state on the equator ($s_3$=0) by changing the control voltage of the first PZT.

Here the factor of 0.30 is selected as an example and may need to be adjusted for different products, i.e. related with half wave voltages.

EQ 1:

$$d_1 = \sqrt{(s_{11}-s_1)^2 + (s_{21}-s_2)^2 + (s_{31}-s_3)^2}.$$

EQ 2: (in radians)

$$\theta_1 = \sin^{-1}\left(\frac{0.30 \times s_{31}}{d1}\right).$$

Here the factor of 0.30 is selected as an example here and may be need to be adjust for different products, i.e. related with half wave voltages.

EQ 3:

$$\Delta V_1 = \frac{\theta_1 \times V_{\pi 1}}{\pi}.$$

EQ4: (in radians)

$$\theta_2 = \cos^{-1}\{1 - 0.5 \times [(s_{10}-s_1)^2 + (s_{20}-s_2')^2]\}$$

EQ 5:

$$\Delta V_2 = \frac{\theta_2 \times V_{\pi 2}}{\pi}.$$

EQ 6:

$$d = \sqrt{(s_1'' - s_{10})^2 + (s_2'' - s_{20})^2 + s_3''^2}.$$

FIGS. 10, 11, 12, and 13 are the flow charts for the control operations for the system 600 in FIG. 6. The control circuit 620 may include a digital signal processor or a microprocessor that is programmed with the control logics in FIGS. 10–13. The direction of V2 should consider the sign of $s_1'$ and the characteristics of the squeezer (the relationship between increasing voltages and polarization rotation, the same consideration may be applicable to all control operations.

Figure 10:
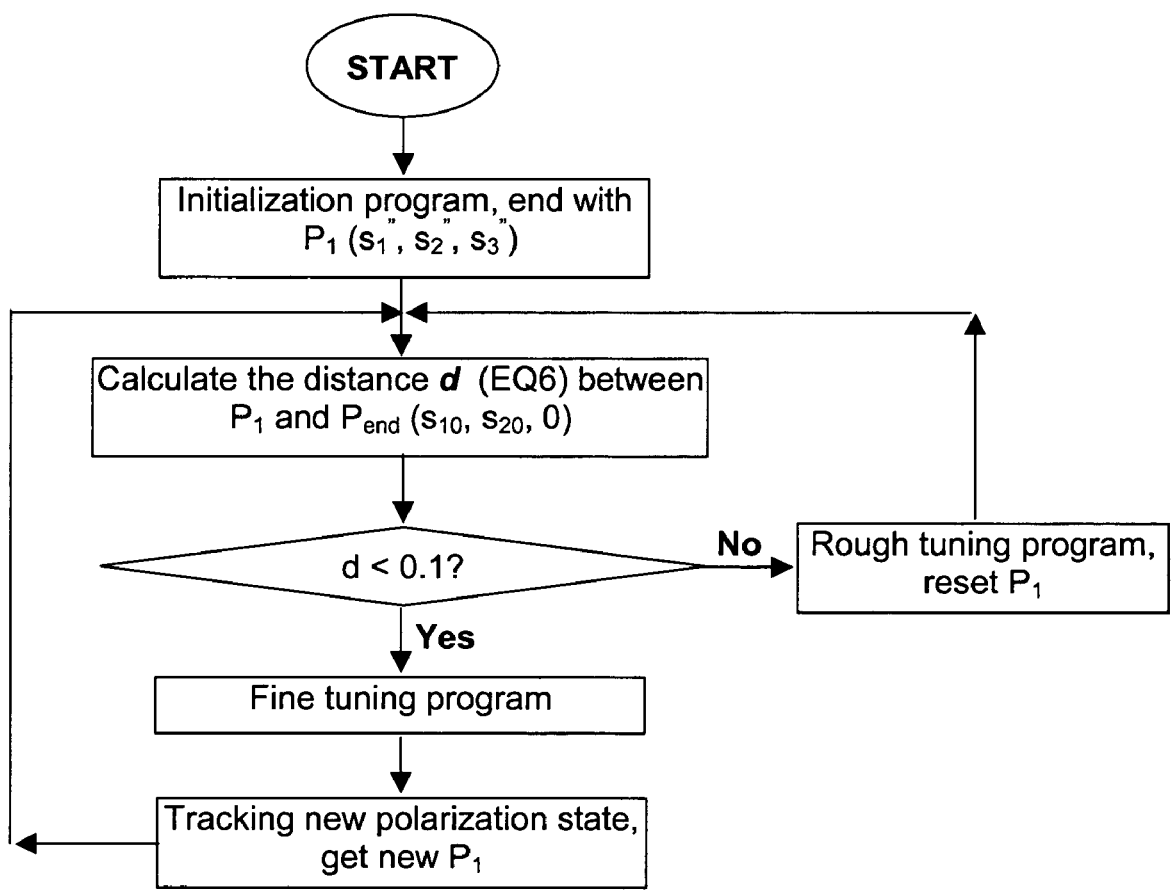
FIGS. 10, 11, 12, and 13 show exemplary flow charts for the control operations for the system 600 in FIG. 6.
Figure 11:
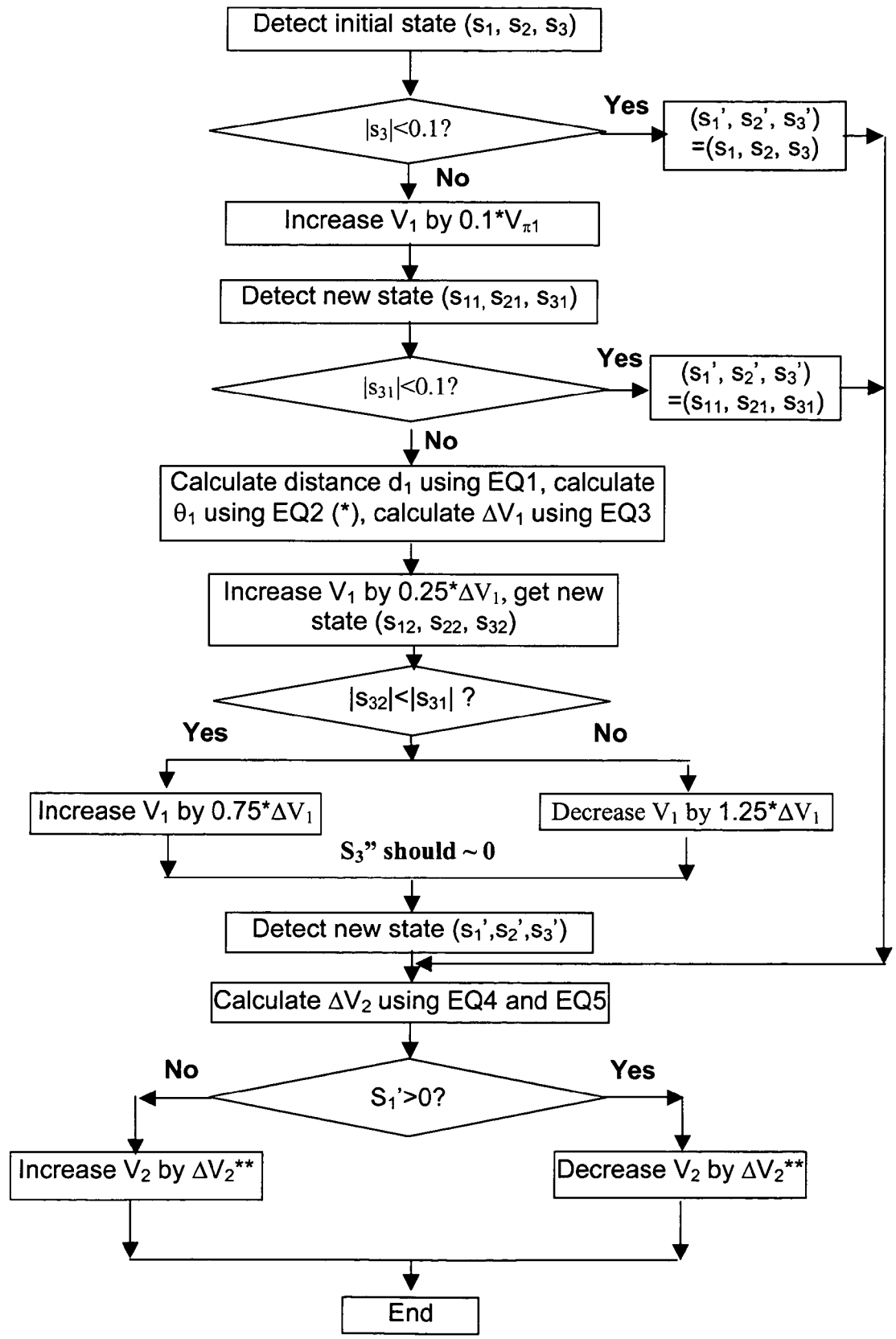
Figure 12:
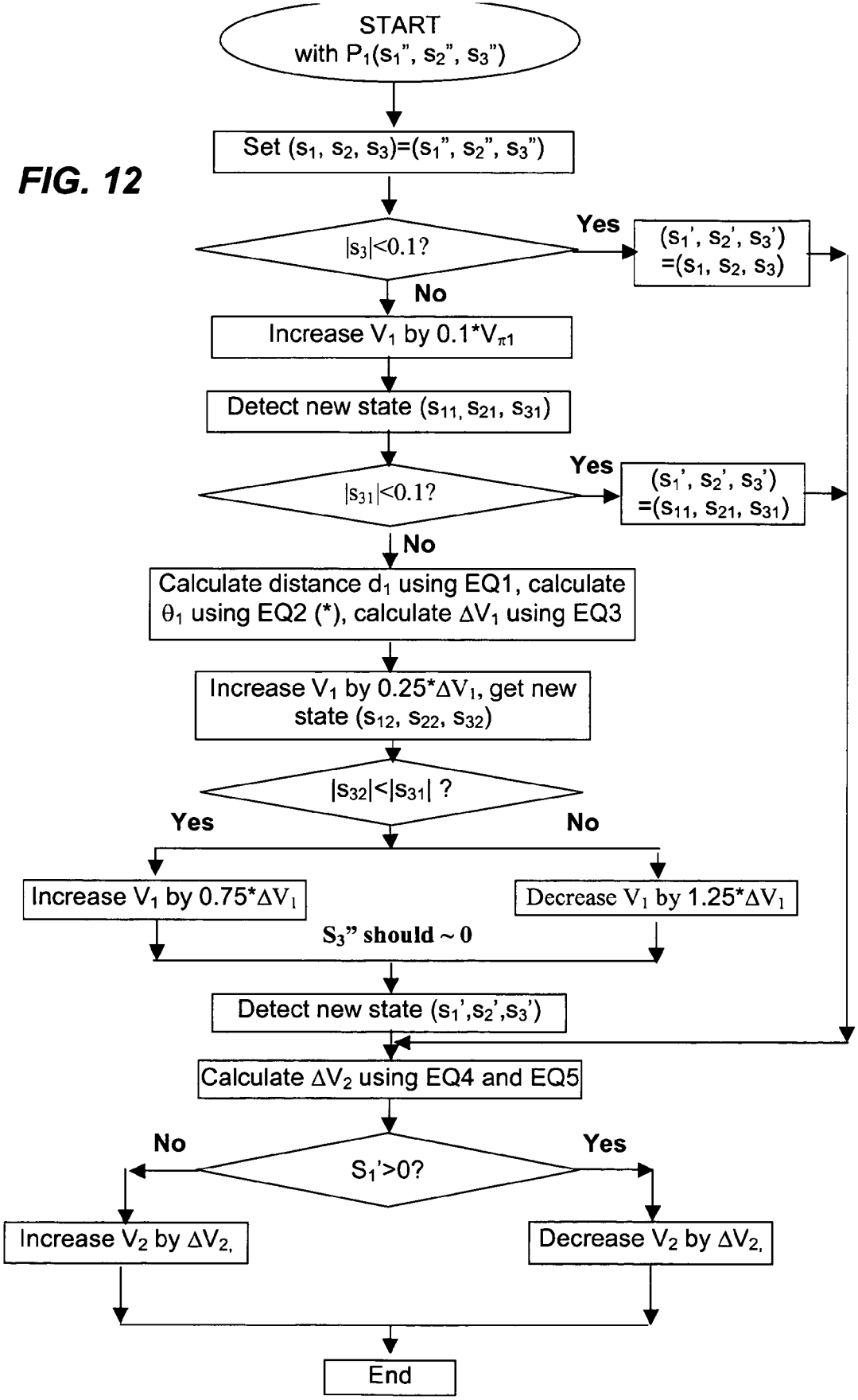
Figure 13:
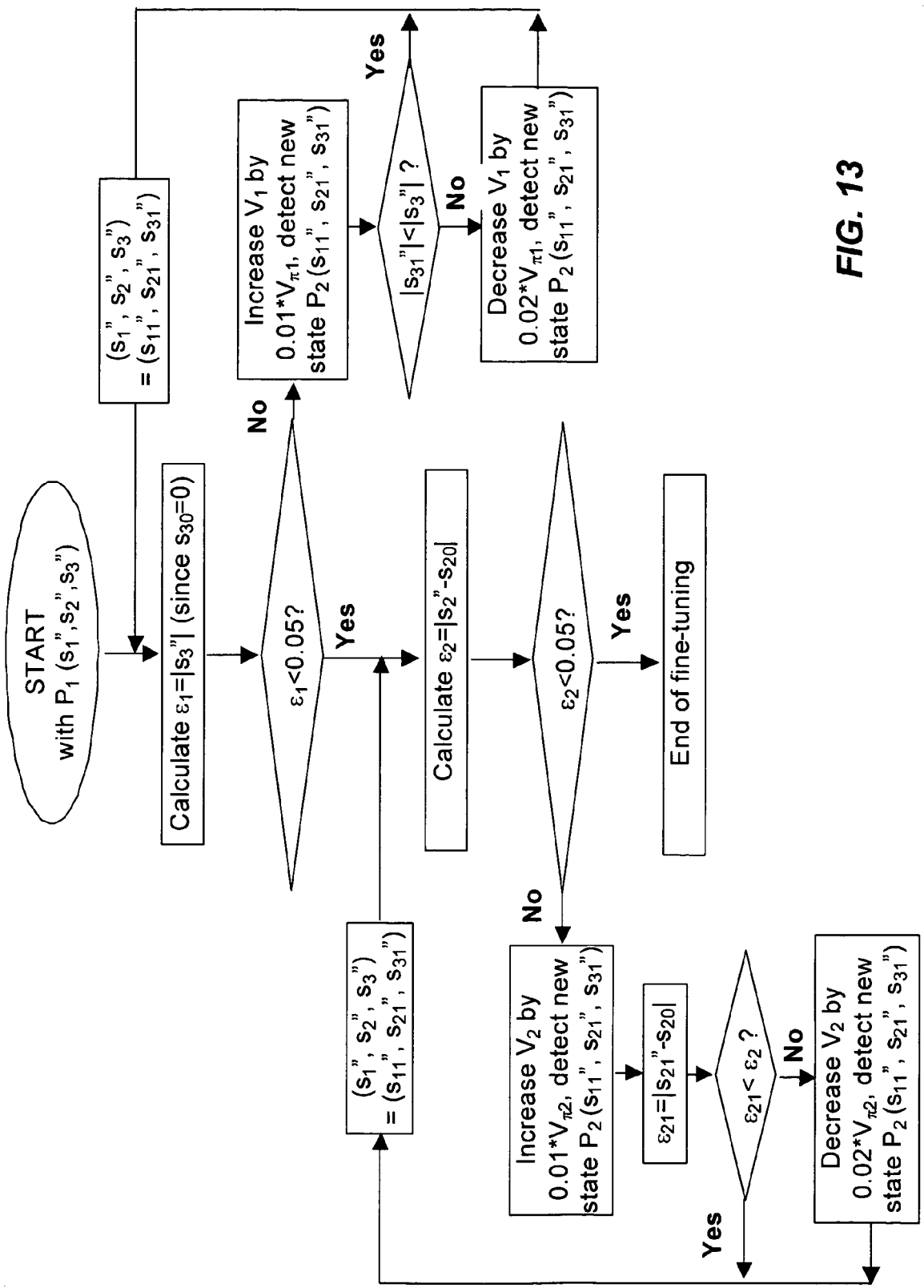

FIG. 10 shows the main operation flow for controlling the system 600 in FIG. 6, where the value of "0.1" for d is an exemplary value for the tolerance limit. This tolerance limit may be set at other values according to the requirements of a specific application that employs the system 600, e.g., increasing the stability or tracking speed of the algorithm. FIG. 11 shows the initialization flow chart. Note also that the tolerance limits for S3 and S31 in FIG. 11 are set at 0.1 as an example and may be set at other values to meet the requirements of the application. The selected values for the tolerance limits for $s_3$ and $s_{31}$ may be different. In addition, the changes in the voltages for the iteration operations in FIG. 11 and other flowcharts in this application, such as $0.1V_{\pi 1}$, $\Delta V1$, $\Delta V2$, $0.25\Delta V1$, $0.75\Delta V1$, and $1.25\Delta V1$, may be set at different increments from the values illustrated. Selection of such values may be used to increase the stability or tracking speed of the algorithm. FIG. 12 shows the rough tuning flow chart referred in FIG. 10. In both FIGS. 11 and 12, if A of sin(A) is more than 1.0, just define $\theta_1$ to be $\pi/2$, and the corresponding $\Delta V_1$ be $V_\pi/2\cdot\cos(1.2-A)*1.5$ Volts. FIG. 13 shows the fine tuning flowchart referred in FIG. 10.

Alternatively, the system 600 in FIG. 6 may be controlled without the fine tuning control shown in FIGS. 10 and 13. During the rough tuning program as described above, we can also add one more step that can calculate the fine tuning voltage for PZT1 and PZT2 using EQ2–5, i.e. first we confirm that $s_3''=0$ by one more step on PZT1, and then after rough tuning s2, we add another step to tune PZT2. This can be used under the condition of dramatic polarization perturbation.

When the controller 120 in FIG. 6 uses only two adjustable elements 510 and 520, the two elements 510 and 520 may not be able to guarantee the control voltages of PZT1 and PZT2 within their limits. Hence, a reset operation of the two elements may be needed during the control procedure. Alternatively, additional adjustable elements may be needed to deal with the voltage rewinding problem. The adjustable polarization controller 120 in the system 600 of FIG. 6 may be implemented to have more than two elements to improve the control performance. For example, the 4-element implementation in FIG. 5B may be used to address this issue where the 0-degree elements 510 and 512 are applied with the same voltage V1 and the 45-degree elements 520 and 522 are applied with the same voltage V2.

Figure 15A:
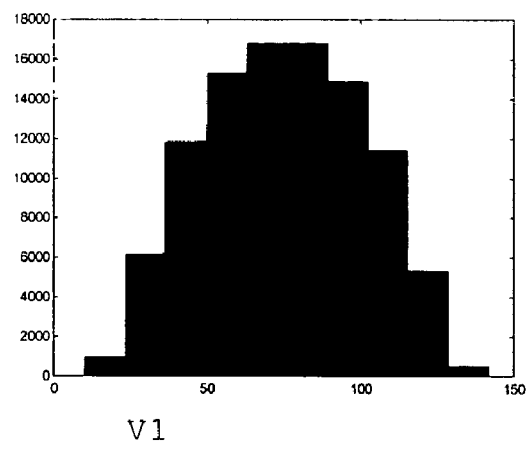
FIGS. 15A, 15B, and 15C show histograms for evaluating performance of the system in FIG. 6 with a controller configured as in FIG. 4B or 5B.
Figure 15B:
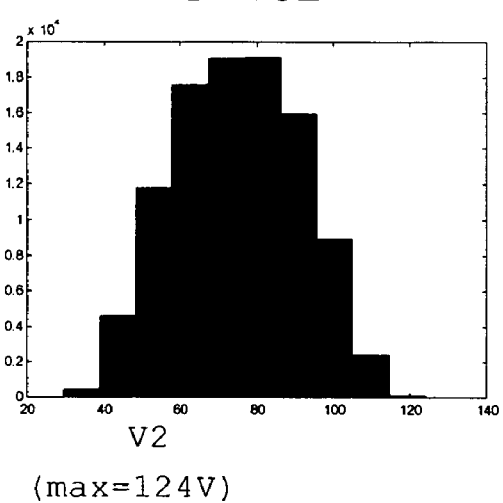
Figure 15C:
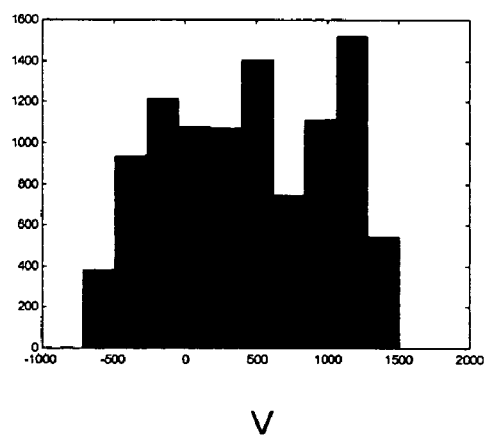

FIGS. 15A and 15B show computer simulated histograms for the 4-element implementation in FIG. 5B. For 100,000 independent samples, all the voltages of PZT1 (V1) and PZT2 (V2)(parallel to PZT1) are within [0,150]. As a comparison, FIG. 15C shows the computer simulated histogram for the 2-element implementation shown in FIG. 6 based on FIG. 5A. As shown, most of the voltages (V) are out of range.

Figure 14:
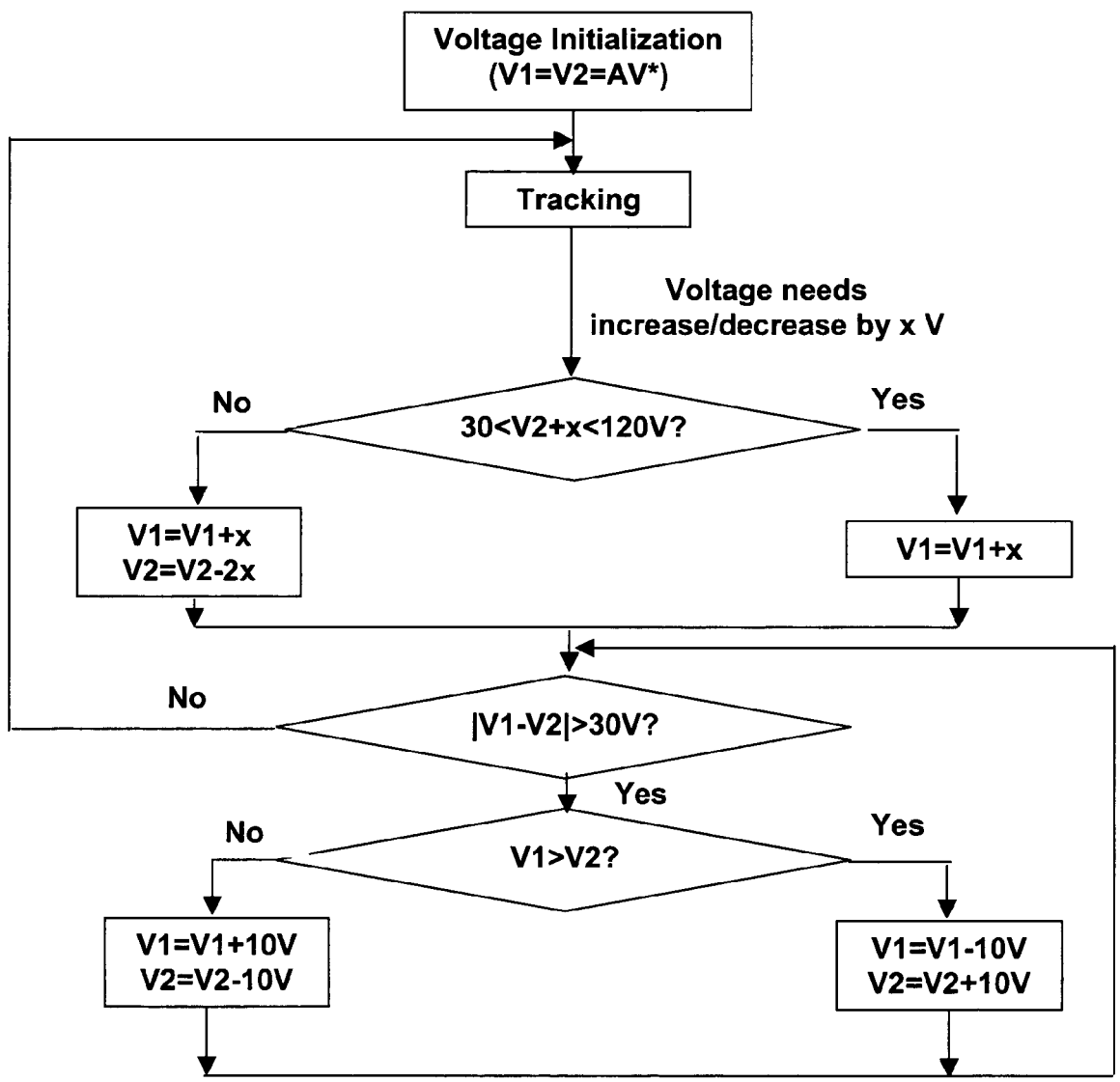
FIG. 14 shows one control logic for using two pairs of parallel squeezers shown in FIG. 5B (or FIG. 4B) as the controller 120 in FIG. 6 is to realize voltage balance during the tracking by step increase/decrease of voltages.

The main idea of using two pairs of parallel squeezers shown in FIG. 5B (or FIG. 4B) as the controller 120 in FIG. 6 is to realize voltage balance during the tracking by step increase/decrease of voltages. FIG. 14 shows the control operation in one implementation where A is the previous voltage of the driver. The voltage limits used in FIG. 14 are examples only and may be set at other values. This program can be used as a sub-program of the former control algorithm (after each voltage changing) designed for the two-section case in FIG. 10 so that endless polarization tracking can be achieved.

In the 4-element implementation for the controller 120 in FIG. 6, we can rewind the control voltages at the eigenstate of the polarization controller, i.e. when the input polarization is at the eigenstate of the polarization state. Under this condition, changing the control voltage does not affect the output polarization state. This eigenstate rewinding can be used to minimize the power penalty during the dynamic tracking procedure.

This method can be realized during the dynamic control procedure. (a). For the first pair PZT (horizontal), since we need determine the radius of the circle (see details about this in the former algorithm for two-squeezer controller) by increasing a fixed voltage ($0.1*V_\pi$), if the radius of that trace is within a small range, we can regard that state as the eigenstate of the first PZT. Under this scenario, we can rewind the voltage of PZT1. (b). For the second pair PZT (45°), the eigenstate is the poles on the Poincare sphere (after using quarter wave plate). So if we meet this condition, we can rewind the second voltage.

Figure 16:
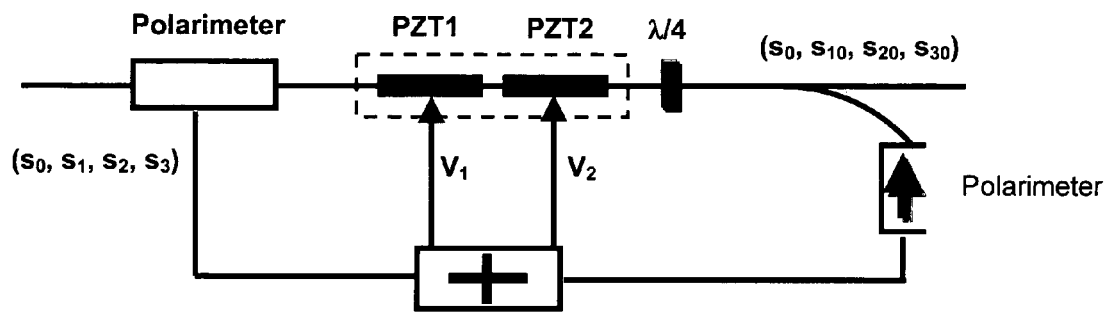
FIG. 16 shows another example of a system with both feedback and feedforward controls.

Referring back to FIG. 3, the feed forward control may be combined with the feedback control to control a polarization controller 120. FIG. 16 shows one implementation where the controller 120 has two fiber squeezers 510 and 520. If the input is $(s_0, s_1, s_2, s_3)$, and the desired output is $(s_0, s_{10}, s_{20}, s_{30})$, the following two equations will give the corresponding phase retardations (linear relation with the driving voltages) of the two sections:

$$\varphi_2 = \cos^{-1}\left(\frac{s_1}{s_{10}}\right), \text{ and}$$

$$\varphi_1 = \cos^{-1}\left(\frac{-s_{30}s_2 \pm \sqrt{s_3^2(s_3^2 + s_2^2 - s_{30}^2)}}{s_2^2 + s_3^2}\right).$$

These retardations provide a rough control to move the SOP to the vicinity of the desired SOP, a polarizer that is embedded in the product or the polarization dependent device (e.g. $LiNbO_3$ modulator) is used to monitor the optical power on some special polarization direction to deal with the fine-tuning. The two above equations provide the phase retardations including the pre-loaded ones that are not easy to determine unless we can determine by calibration to find the intrinsic control voltages that induces a unit matrix.
b. Or if we need to get the initial transfer matrix of the device, we need to measure the output SOP that needs another polarimeter.

In the above and other polarization tracking or stabilizing systems, multiple elements are used in a polarization controller to control the state of polarization (SOP). For example, in such kind of systems, tracking the input SOP to a fixed output SOP or finding a specific SOP is desirable for the system optimization, parameter characterization, or performance measurement.

Figure 17A:
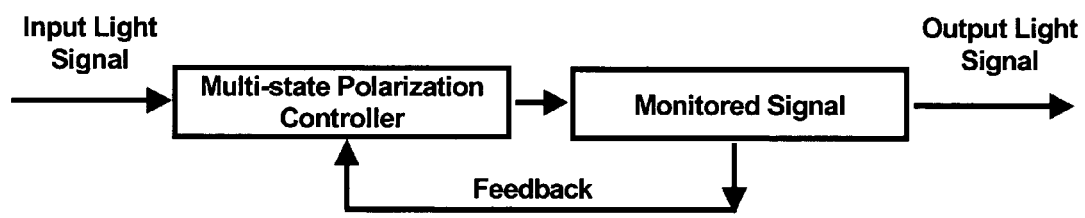
FIGS. 17A and 17B show two examples of feedback systems.
Figure 17B:
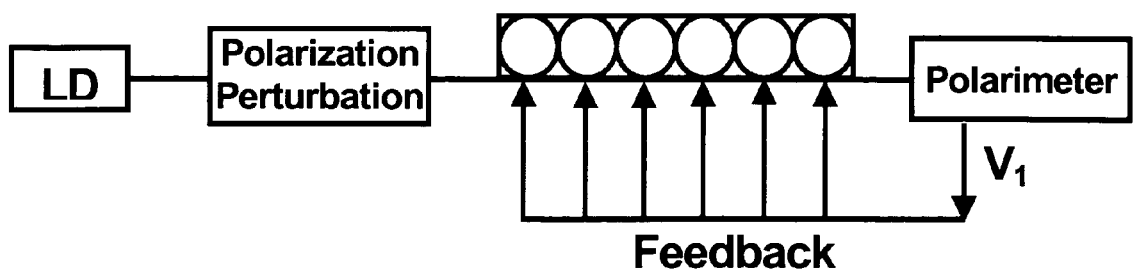

FIGS. 17A and 17B show two examples of multi-stage polarization controllers with feedback control loops. The polarization controllers may include fiber-squeezer, LiNbO3, liquid crystal, and other adjustable birefringent elements. The monitored signal used as the feedback on the polarization controller may be the optical power, SOP, or other parameter of the output from the polarization controller. A control circuit is used in the feedback loop and is programmed with the control logics to control the polarization controller based on the feedback signal. A digital circuit such as a microprocessor may be used as part of the control circuit.

Figure 18:
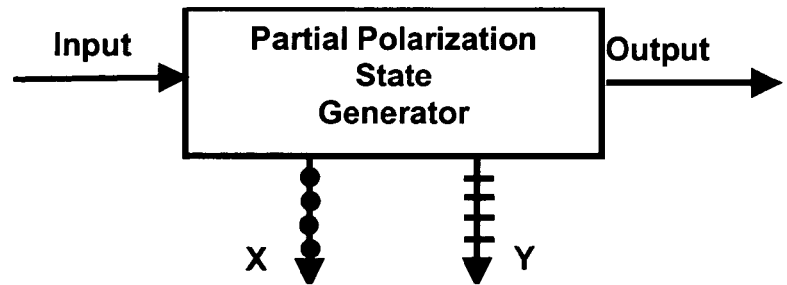
FIG. 18 shows one example for generation of a feedback signal in FIGS. 17A and 17B.

FIG. 18 shows that a partial polarization generator may be used to produce a component of different polarization states as the feedback signal. The partial polarization state generator may include a combination of partial optical splitter and polarizer and operate to separate the horizontal and vertical components of the input light. Either one or both of the horizontal and vertical components of the input light may be used to generate the feedback signal.

Figure 19:
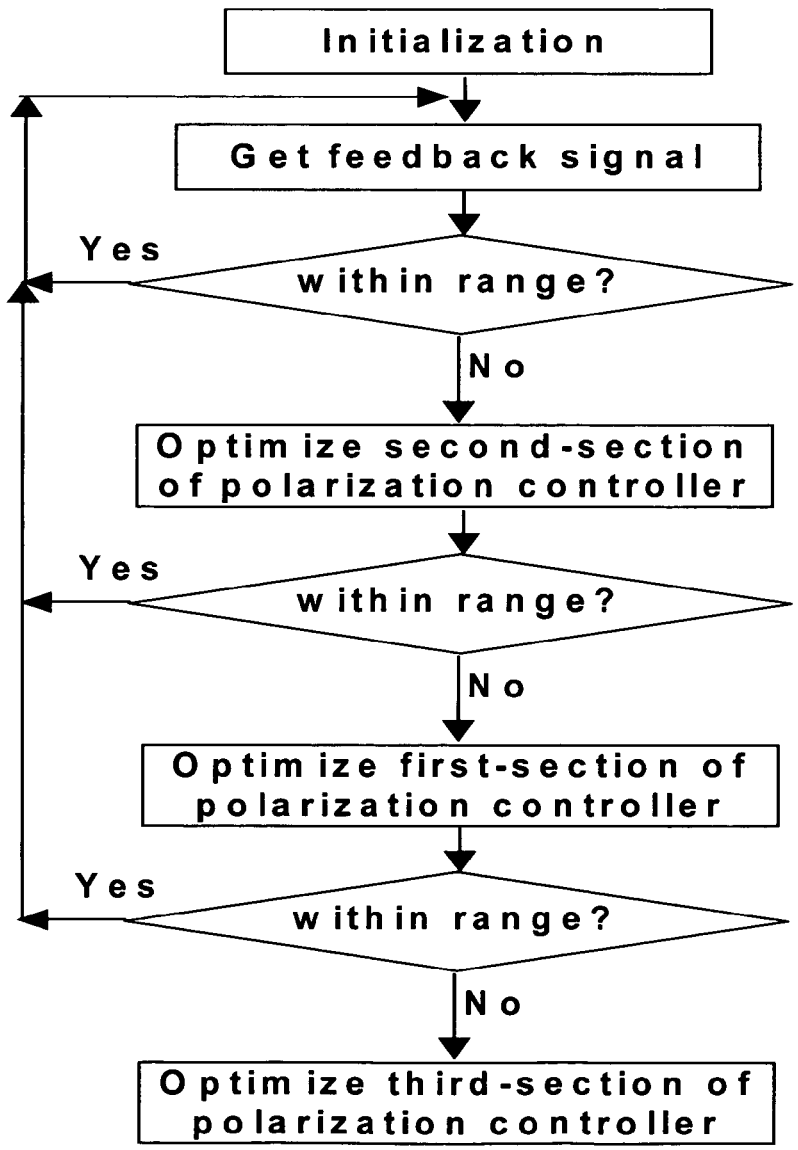
FIGS. 19, 20, 21, 22, and 23 are exemplary control logics for the feedback systems in FIGS. 17A and 17B.
Figure 20:
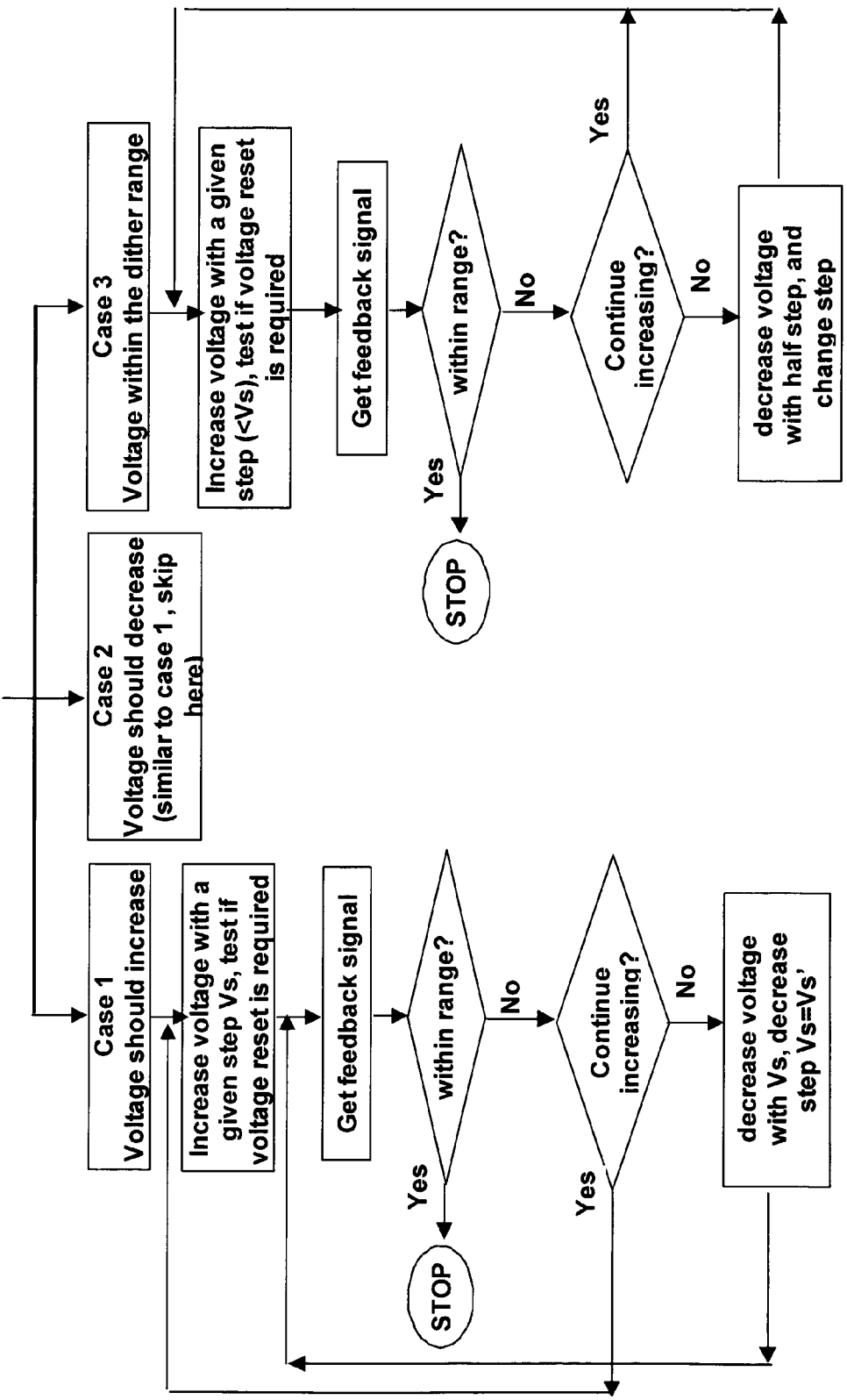

FIG. 19 shows the operation steps in the feedback control in one implementation to control the multi-section polarization controller to find the desired output polarization state. The control operates on the first input section within the controller first and moves on to next in a sequential manner until all sections within the controller are optimized. FIG. 20 shows the operations in optimizing n-section of the polarization controller in the feedback system in FIGS. 17A and 17B.

The control technique in FIGS. 19 and 20 allows for fast response times, robustness with respect to the input power fluctuations, and elimination of local fading point during tracking.

In implementation of the above control for the systems in FIGS. 17A and 17B, a reset-free operation may be achieved. As an example, detailed control for a six-stage fiber squeezer based polarization controller in FIG. 17B is described here. A rotatable waveplate driven by a step-motor may be used after the light source to perturb the input polarization state. The polarization stabilization unit is composed of a six-axis fiber squeezer polarization controller followed by a high-speed polarimeter. A voltage output from the polarimeter (i.e. corresponding to the optical power) is used as the feedback signal on the six-axis polarization controller. Thus by controlling the voltages on each stage of the polarization controller, we can maximize the feedback signal from the polarimeter.

Figure 21:
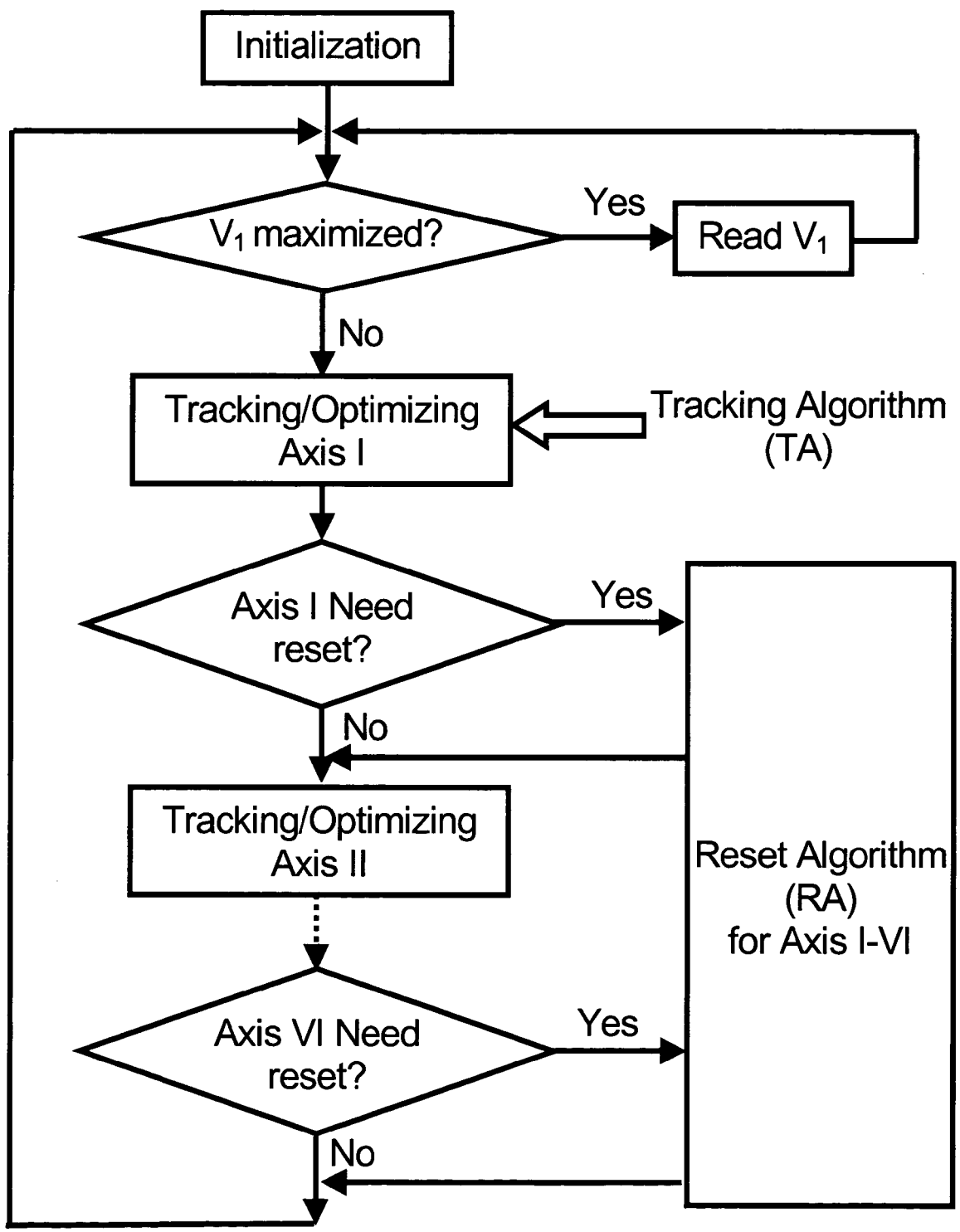
Figure 22:
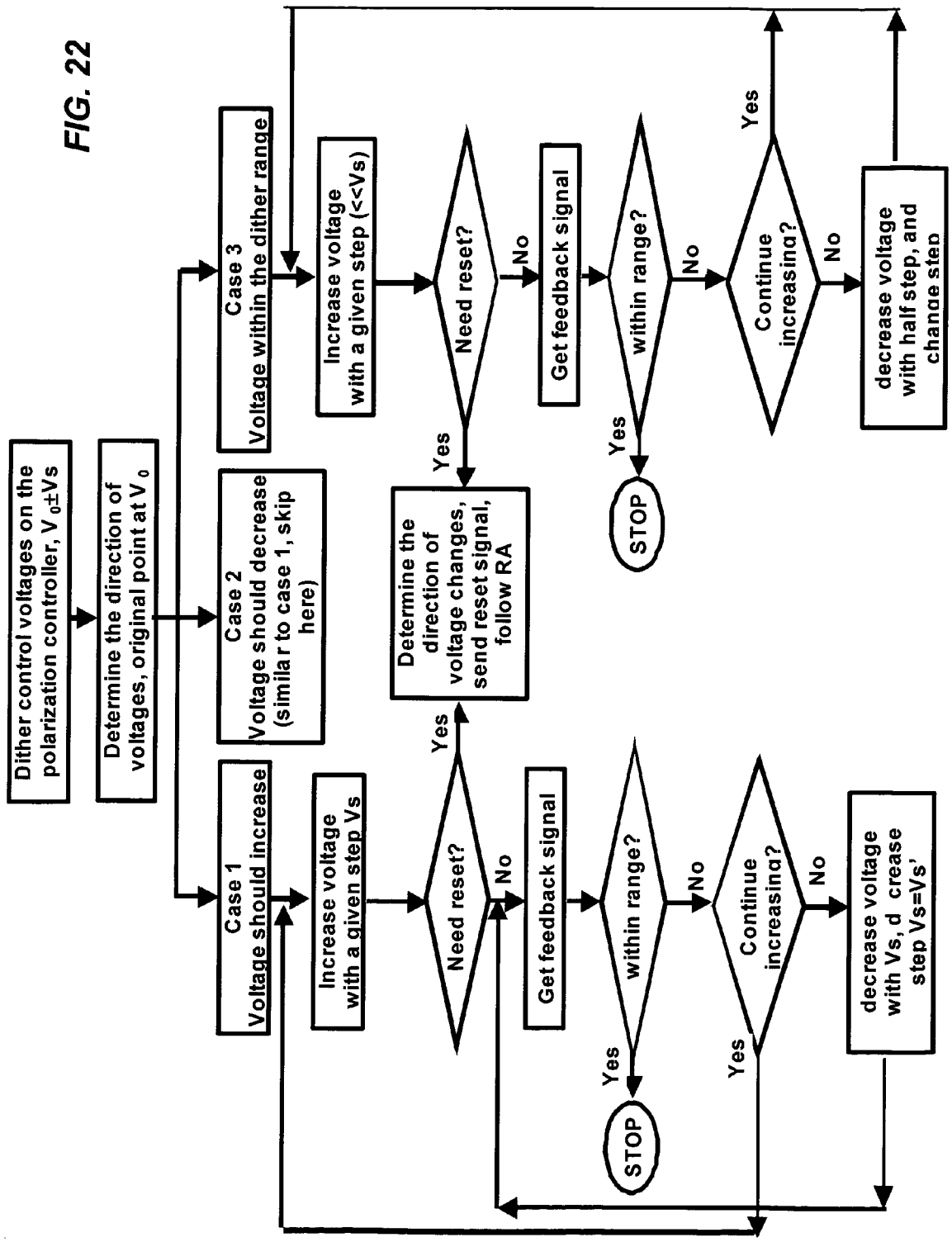
Figure 23:
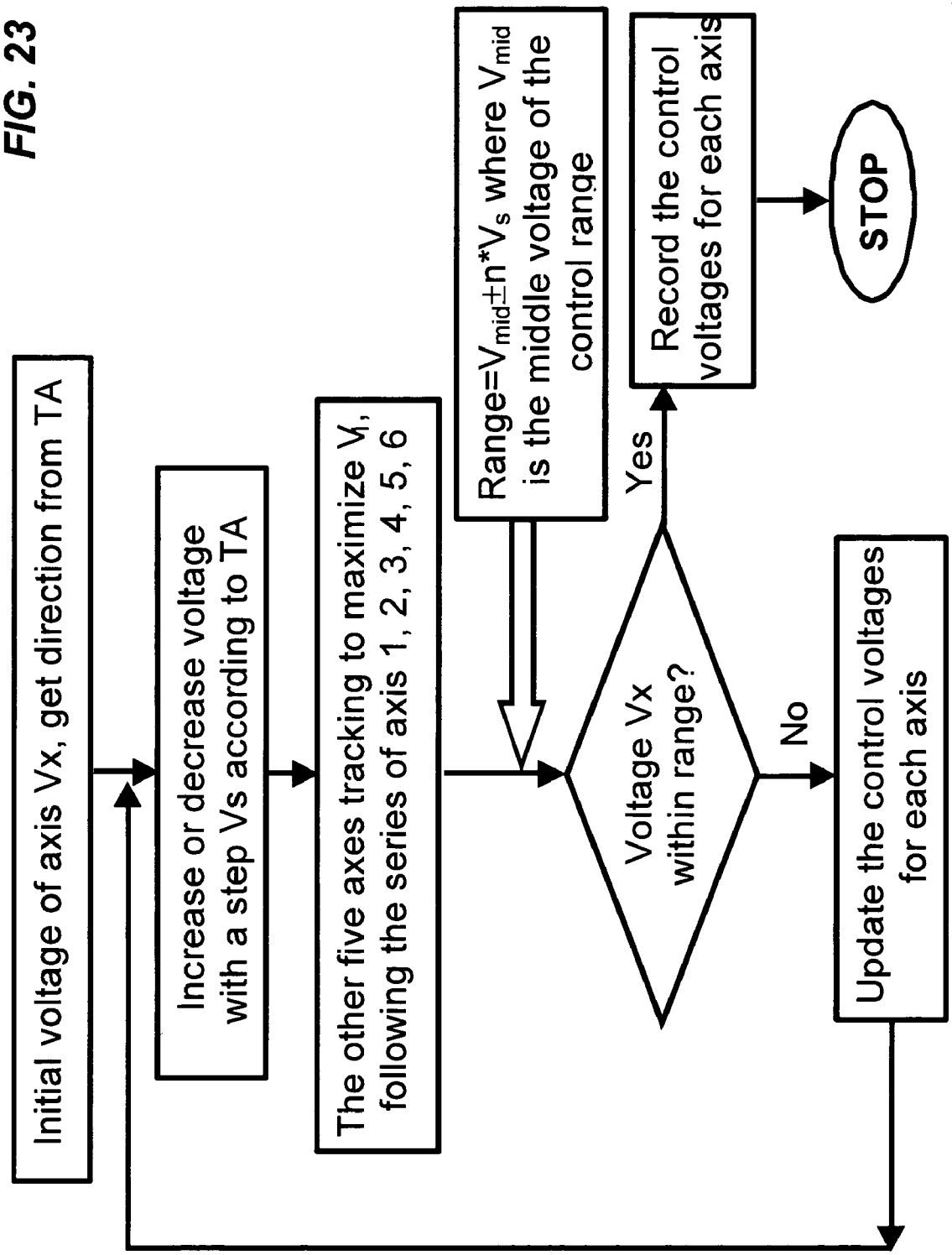

The control algorithms are shown in FIGS. 21–23. FIG. 21 shows the first control algorithm (main program) as main algorithm (MA). FIGS. 22 and 23 show tracking algorithm (TA) and reset algorithm (RA) used in the main algorithm.

The main goal of the feedback is to maximize V1 using the six-section squeezers. By optimizing each section one by one, the V1 can be maximized finally. During the optimization of each section, two control procedures are performed. First, the voltage tracking in FIG. 22 is performed. When the voltage is out of limits (upper and lower), there will be a reset logic signal sent to the reset program. After the tracking procedure stops, this section will follow the reset procedure or continue to the other section, depending on the reset logic.

Note there is another step that is not shown in the flowing chart. After tracking of all the six sections, another step may be added to increase the stability of the control algorithm. Here we use a dynamic procedure to find the section with a voltage that has the largest different between the middle voltage (for our control circuit, this voltage is about 75 volts), and then load the reset algorithm to do the reset procedure to reset that section.

FIG. 22 shows the tracking algorithm for each section to optimize the amplitude of V1. By dithering the control voltage, we can decide the direction of voltage tracking. Also during this tracking, the voltage step may be changed to optimize the final output. For the reset requirement, if the section needs resetting, and it can be reset since we track the six sections one by one, reset is not guaranteed until one section starts and finishes the tracking. Next, this section can be tested to determine whether the reset algorithm is needed in order to avoid resetting this section and then we follow the reset algorithm for that section if the operating point of the section is too close to the upper or lower limit of the operating range. If not, we fix the voltage of that section at either the upper or lower limit of the control voltage range. When a new cycle comes, this section can always decide the tracking possibility. E.g. if the section is at the lower limit, but increasing voltage can optimize V1, then the voltage will be increased, thus this section can depart from the limit and start efficient tracking again.

The basic operation of the reset algorithm (RA) in FIG. 23 is changing the voltage of the corresponding section step by step to move the voltage into a small range near the middle point. As the voltage increases or decreases one step, the other five sections will start tracking to optimize the total output, thus during the reset procedure, the system won't degrade. Although this algorithm can avoid most of the cases where the control voltages can not reach their limits, in theory, there may still be some extreme cases where one or more sections encounter control voltage limits (either upper or lower), and stay at those limits during the reset procedure unless the other direction (i.e. decreasing from upper limit or increasing from lower limit) is possible. In this implementation, the control voltages during tracking are related to the input polarization states to the polarization controller.

The above control techniques may be applied to various systems. The following are some examples.

Figure 24:
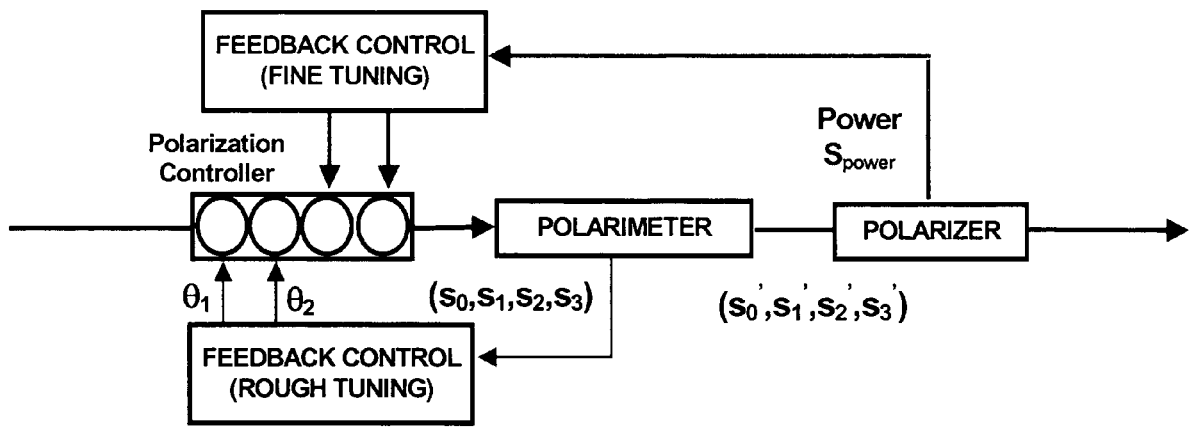

In some applications, system designers want to not only change the input SOP to the desired one, but also improve system performance such as reduction of crosstalk. For such kind of applications, a polarizer can be appended to the polarimeter by aligning its axis with one of the Stokes vector axes of the polarimeter, as shown in FIG. 24. In this configuration, the measured Stokes vector information ($s_1$, $s_2$, $s_3$) can be used as a rough feedback control signals on the first two control voltages of the four-stages fiber-squeezer based polarization controller. As the input SOP has been changed approximately to the desired state on the Poincare sphere, we can use the monitored optical power after the polarizer as feedback for fine-tuning on the other two control voltages. After the rough tuning using the first two PZTs of the polarization controller, we can use the detected optical power after the polarizer as the feedback signal to control the other two PZTs of the polarization controller for fine-tuning.

The algorithm of this fine-tuning is just optimizing or maximizing the optical power after the polarizer. In this case, people always use dithering the control voltages to reach the optimum point. If the control voltages are dithered, the monitored power will change subsequently, thus the optimum point of the tracking is the maximum optical power output.

Figure 25:
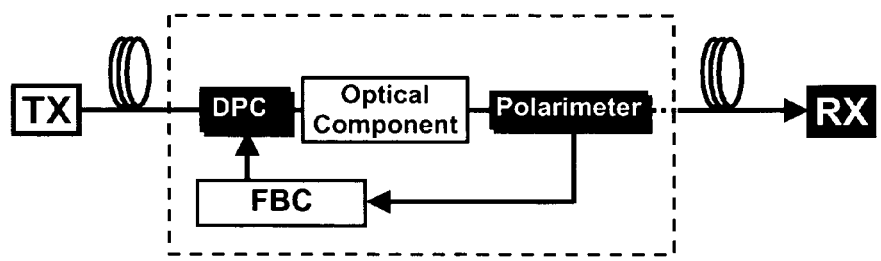

FIG. 25 shows an example for polarization optimization for the components with some amount of polarization dependent loss (PDL). The PDL value of an optical component is defined as the difference between the maximum and the minimum insertion losses for all possible input states of polarization (SOPs). PDL has also been recognized as a critical issue in optical communication systems because various optical networking components, such as isolators, filters, switches, even EDFA, may have non-negligible PDL. Since PDL is induced due to the different loss along the two orthogonal polarization axes, we can always choose the one with smaller loss for transmission, e.g., using a photodiode to detect the optical power as the feedback signal. The output power is optimized to align the input polarization state with the intrinsic polarization axe of the optical component that has the smaller loss. A dynamic polarization controller before the component and a polarimeter are required for such optimization scheme.

Figure 26:
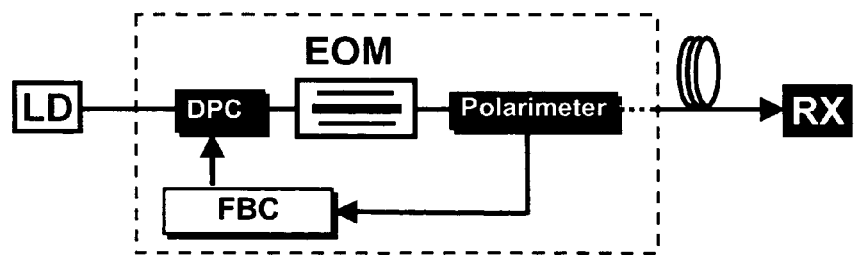

FIG. 26 shows an exemplary system for polarization stabilization of an electro-optical modulator (EOM) based on the above feedback control. A typical transmitter in fiber optical systems is composed of a light source (LD), a polarization controller and an EO modulator (e.g., LiNbO3). Most of the LiNbO3 modulators embed a polarizer at the input or output part of the waveguide, thus the polarization controller need to align the output polarization of the light source with the input polarization of the polarizer. The fluctuation of polarization before the modulator will result in the variation of amplitude of the received data bits. Since the EO modulator (EOM) is highly input polarization state dependent, the output power after the modulator can vary a lot when the input polarization fluctuates. To stabilize this fluctuation, we can monitor the optical power after the EOM and feedback to control the input polarization.

Figure 27:
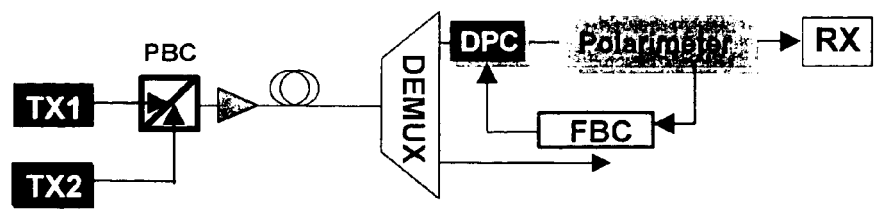
Figure 28:
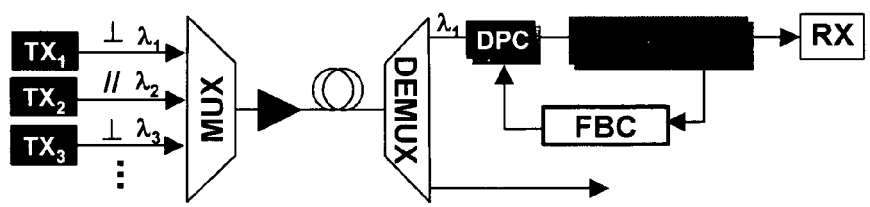

FIGS. 27 and 28 show examples for polarization-assisted crosstalk reduction based on the above polarization feedback control. In order to increase the spectral efficiency of the dense-wavelength-division-multiplexing (DWDM) systems, two polarization-related transmission techniques have been employed: polarization-division-multiplexing (PDM) where two channels have orthogonal polarizations at the same wavelength (FIG. 27) and polarization interleaving where adjacent WDM channels have orthogonal polarizations (FIG. 28). In addition to the traditional crosstalk for WDM systems, the polarization changes of other channels will also add crosstalk to a given WDM channel. A dynamic polarization controller followed by a polarizer is used to reduce polarization-induced crosstalk between the adjacent wavelength channels.

Figure 29:
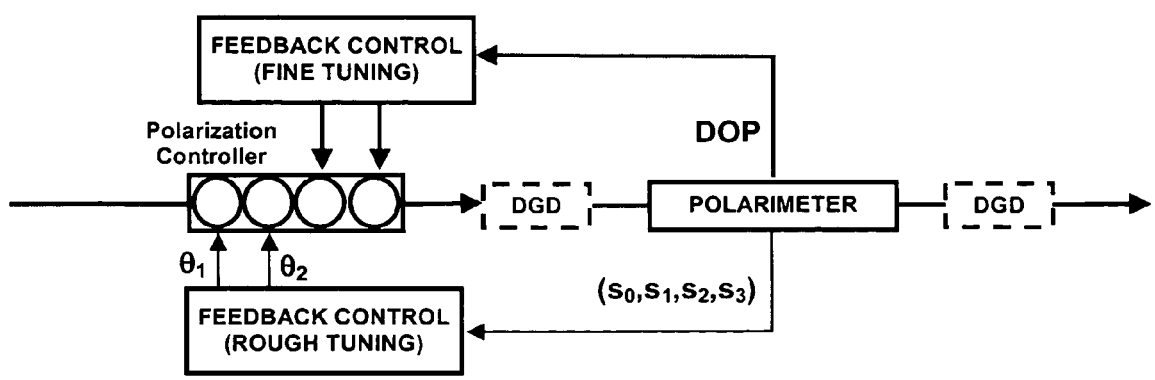

FIG. 29 shows a system for polarization scrambling assisted PMD compensation based on the above feedback control, where fast polarization scrambling is implemented after the transmitter. In this scheme, the instantaneous DGD value can be obtained by the evaluation of the DOP information. At the output of the fiber link with PMD, the polarimeter monitors the variation of the polarization states including the DOP. The polarimeter acquires a given number (e.g. 100) of SOPs in millisecond time scale and displays the measured SOPs on the Poincare sphere, where the DOP determines the length of a Stokes vector. The measured SOPs form an ellipsoid whose shape reveals information about the system's PMD and PSP. In a first-order PMD distributed system the DOP is equal to unity for input polarizations matching the PSP. The more the input SOPs differ from the PSP, the more the DOP is reduced, thus the measured output SOPs form an ellipsoid whose long axis has a length of unity and points into the direction of the PSPs. For the higher-order distributed systems, the ellipsoid's long axis is less than unity. In such kind of compensation scheme, a variable DGD element is required. Using the monitored information, including instantaneous DOP, SOPs (PSPs), we can always align the input PSP that points to the longest axis on the ellipsoid formed by the SOPs in a given time, with the intrinsic axis of the DGD element as described in the flow chart, while here the PSP is not derived from SOP information, but formed from the SOP distribution in a given time.

To reduce the impairment induced by PMD, different approaches have been applied in systems: i). Employment of new fiber with low PMD value (the old embedded fiber in late 80's has a typical PMD value more than 2–5 ps/km1/2. The PMD of new fiber can be as low as 0.1–0.5 ps/km1/2). ii). PMD compensation that will be discussed in the main part of this paper. iii). Signal regeneration along the transmission link, optical regeneration called as 3R (reshaping, retiming, and re-amplifying) is preferred. iv). Other mitigation techniques, such as Forward-error-correcting-coding (FEC). PMD compensation (PMDC) includes the first-order compensation and higher-order compensation.

Figure 31A:
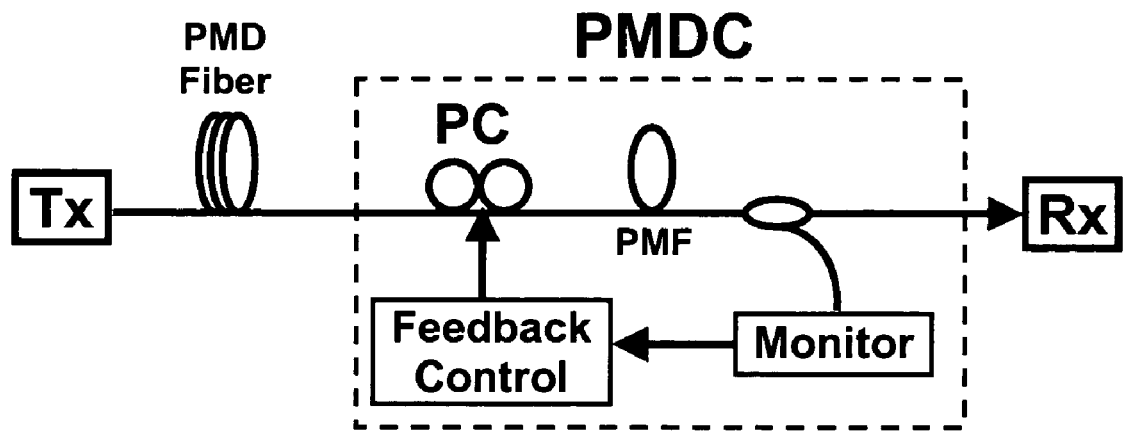
Figure 31B:
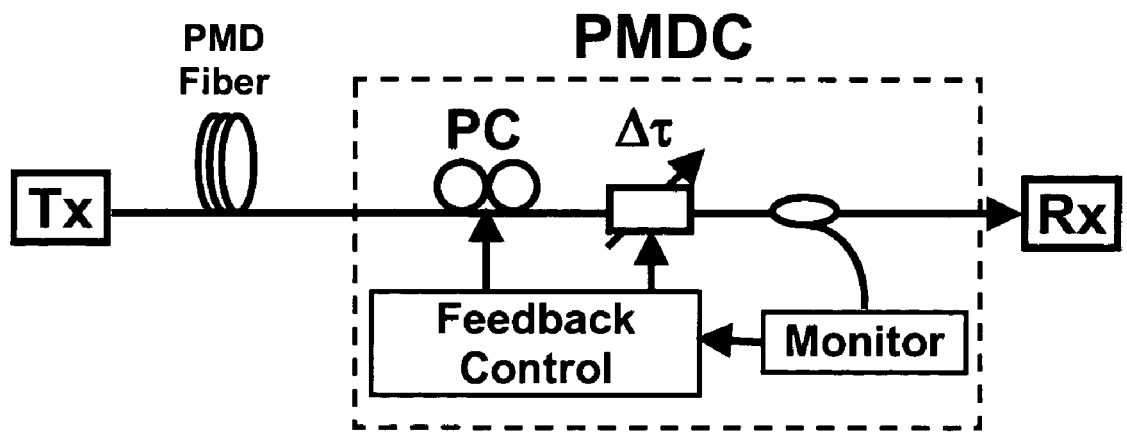

FIG. 31A shows an example of a first-order PMD compensator using the above feedback control. This system includes a polarization controller and a fixed differential group delay (DGD) element, normally a piece of polarization maintaining (PM) fiber. A polarization controller with degrees of freedom (DOF) that suffices with a ½ retarder followed by a ¼ retarder to transform a given polarization state to an arbitrary output can provide all the polarization states on the whole Poincaré sphere while three DOFs can provide re-set free function that is required for dynamic tracking. Since the fixed DGD element can't completely cancel the instantaneous DGD (Dt) along the link, a variable DGD element, instead of the fixed one, following the polarization controller, is used to make a variable PMD compensator. FIG. 31B shows this configuration. The variable DGD element can be free-space delay line, E-O based device, FBG, etc.

Figure 32:
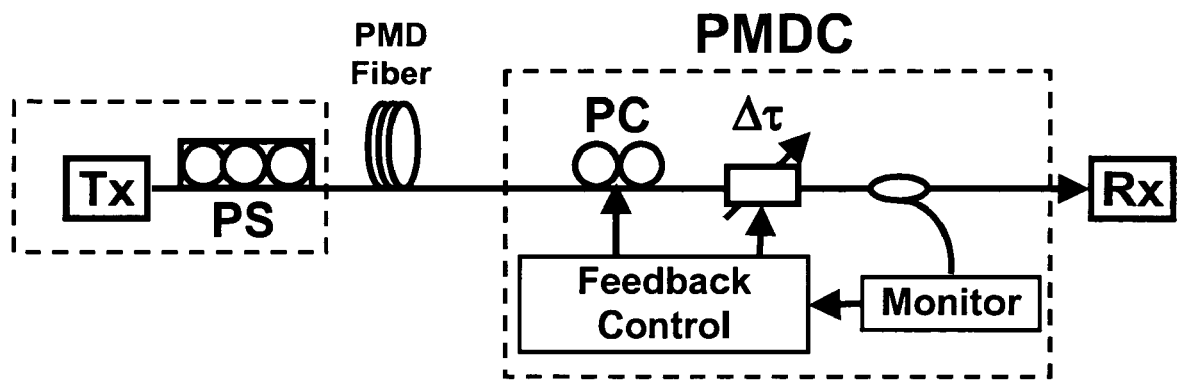

FIG. 32 shows a polarization scrambling combined with variable DGD compensator based on the above feedback control. It is known that dynamic tracking of polarization is quite difficult and sometimes it can fall into local minimum during the tracking. Also degree-of-polarization (DOP) monitoring can't provide the proper estimate of DGD because of its dependence on the input polarization. To avoid this problem, a fast polarization scrambler after the transmitter shown in FIG. 32 may be used. The polarization scrambling not only can facilitate the dynamic feedback tracking, but also can give the instantaneous DGD value or even PSP information. The speed of polarization scrambling here should be much faster than the response or measurement time of DOP.

Figure 33:
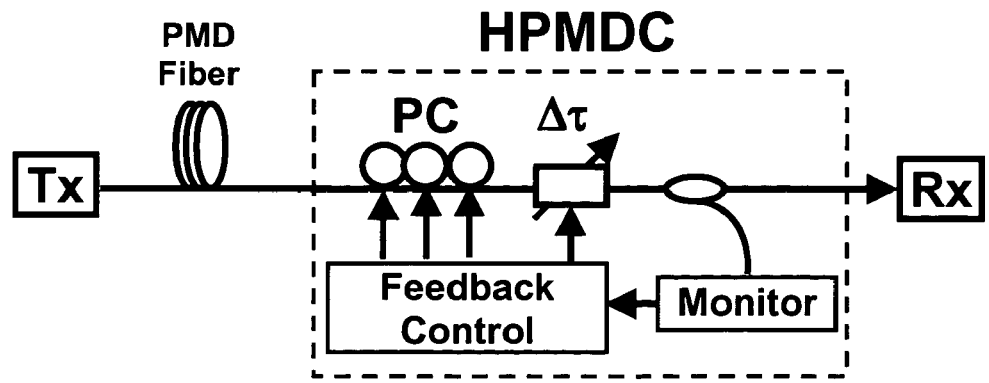

FIG. 33 shows a high-order PMD compensator based on the above feedback control. Second or higher order PMD impairments may be masked in an uncompensated system if the system is already severely impaired by first-order PMD when the magnitude of the second-order PMD becomes significant. However, first-order PMD compensators may eliminate DGDs as large as the bit period but may leave significant residual second or higher order PMD. Thus the efficient compensator should take into consideration not only first-order PMD, but also higher-PMD effects. In FIG. 33, the polarization controller should have three degrees of freedom followed by a variable DGD. By monitor the DOP and optimize all 3 DOF to make the DOP as large as possible, this 3-DOF PMD compensator can compensate higher-order PMD.

Figure 34:
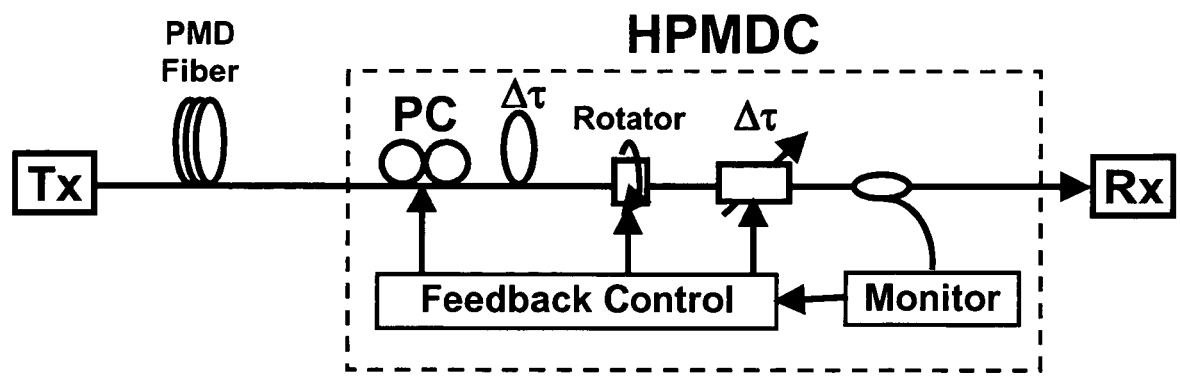

FIG. 34 shows a two-stage higher-order PMD compensator based on the above feedback control. A polarization controller followed by a fixed DGD element can handle the depolarization component of the second-order PMD, then a rotator followed by a variable DGD element will deal with the residual first-order PMD (part of them is induced by the higher-order compensator). Thus there are only two additional degrees of freedom compared with first-order PMD compensator using variable DGD.

Figure 35:
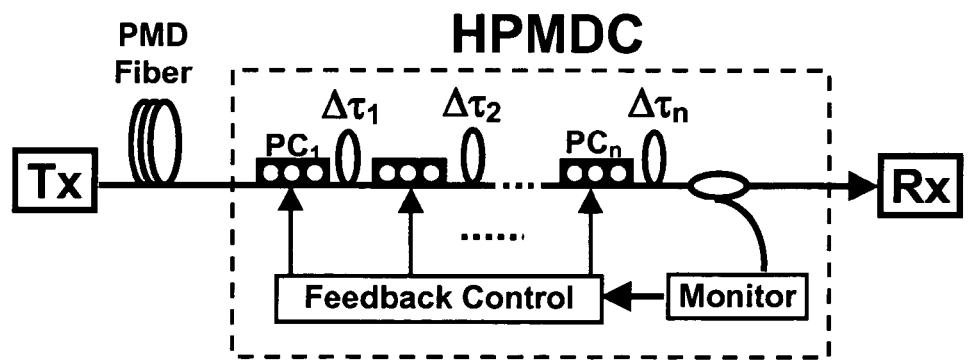

Since the PMD is distributed as Maxwellein along the fiber, the most efficient way for PMD compensation seems to be a distributed compensator. A multi-section PMD compensator in FIG. 35 may be used based on the above feedback control. By controlling the rotation between different DGD elements, the total average PMD will be changed to compensate the link PMD. In principle, this kind of PMDC can handle all the higher-order PMD.

Figure 36:
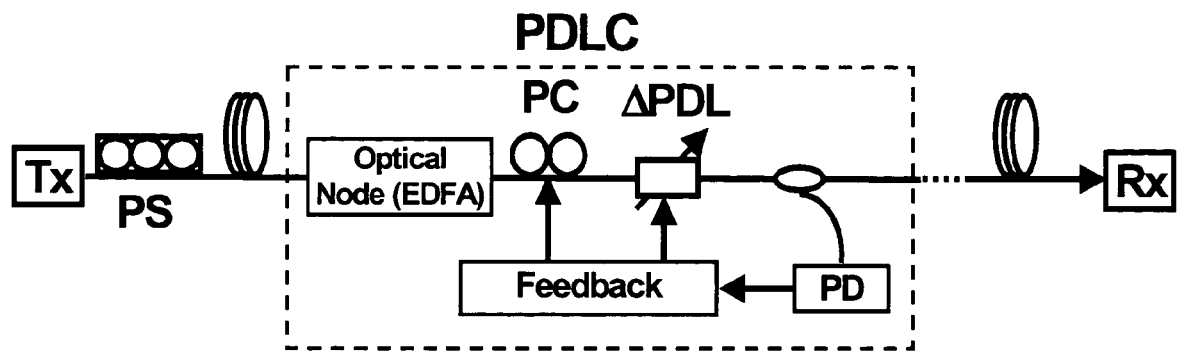

FIG. 36 shows a fast PDL monitoring and compensation scheme using the above feedback. The performance degradation due to polarization dependent gain (PDG) may be suppressed by scrambling the State of Polarization (SOP). Since the PDG magnitude is proportional to the DOP, by scrambling the SOP of the signal at frequencies that are higher than the inverse of the response time of the EDFA, a very low DOP can avoid Polarization-Hole-Burning (PHB) and suppress PDG. In order to monitor the PDL along a cascaded EDFA link and avoid the influence of EDFA transients, a fast polarization scrambler is necessary after the transmitter, i.e. at the beginning of the link. Normally the scrambling frequency should be higher than 20 kHz depending on the cascaded EDFAs. The PDL value along the link or of the optical node is obtained from the root-mean-square variation of the photo-detected signal power induced by PDL. PDL compensation (PDLC) can be performed at each optical node between transmission fibers by adjusting the in-line compensators to minimize the monitored optical power variation.

The following provides additional application examples of the above feedback control that combine fixed DGD element (FDGD), variable DGD source (VDGD), multi-section PMD emulator/compensator (MDGD), fixed PDL element (FPDL), variable PDL source (VPDL), and electrical-control variable PDL source (EVPDL) in various in-line configurations.

Figure 37A:
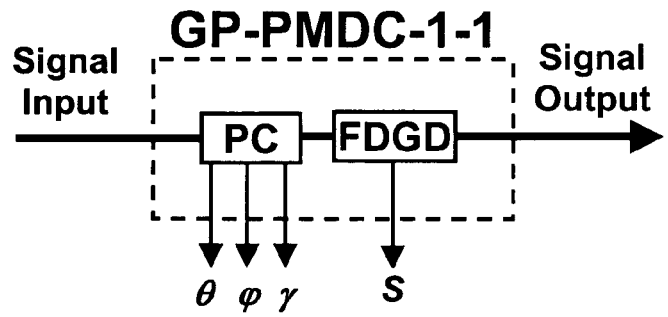
Figure 37B:
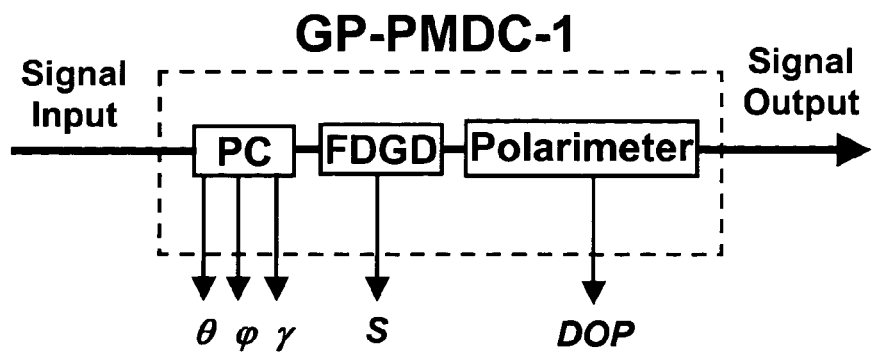

FIG. 37A shows an in-line PMD compensator (GP-PMDC-1-1) using the above feedback control. The optical signal comes through the PMD compensator that is comprised of a polarization controller (PC) and a fixed DGD element (FDGD). The customers can choose their own feedback control signals, e.g. RF, DOP, etc. The module only has three control outputs for the polarization controller so that the polarization controller can change the state of polarization (SOP) of the input signal to align the fast and slow axes of the fixed DGD element with the slow and fast axes of the input signal distorted by FMD. To make the fixed DGD suitable for different bit rates or different fiber types, we choose a switchable DGD (a pseduo-fixed DGD) element with the DGD can be switched between 6 PS, 12 ps, 25 ps and 40 ps. Other values are also available for different applications. Since the DOP of the signal will be decreased by the link PMD, in FIG. 37B(GP-PMDC-1), a polarimeter is added. This polarimeter may monitor the DOP of the input optical signal and can be used as feedback to control the polarization controller (PC) so that the DOP can be maximized, i.e. PMD can be compensated.

Figure 38A:
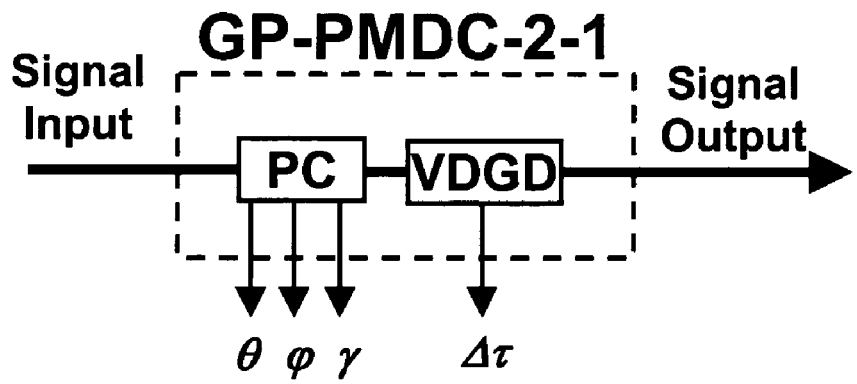
Figure 38B:
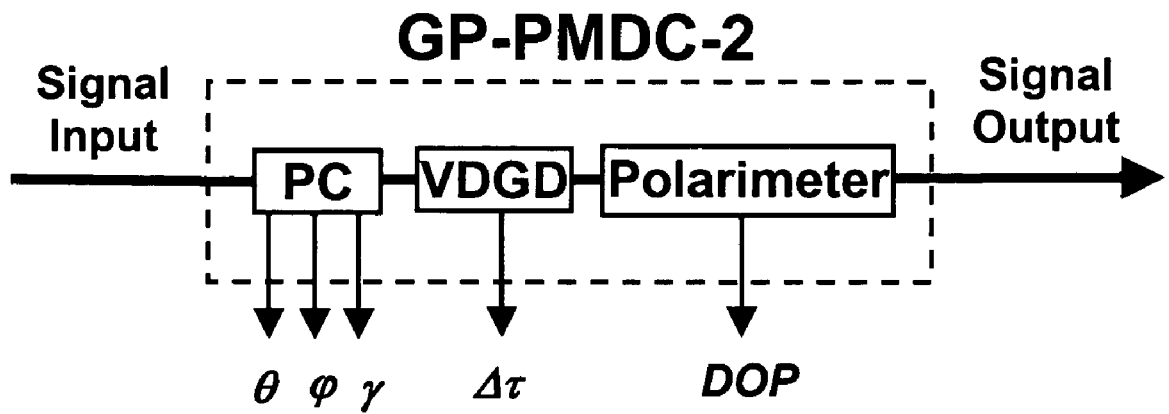

Since fixed-DGD element can not exactly compensate the DGD value along the link, in FIG. 38A (GP-PMDC-2-1), instead of the fixed DGD element, the optical signal comes through the PMD compensator that is comprised of a polarization controller (PC) and a variable DGD element (VDGD). Similar to GP-PMDC-1-1 in FIG. 37A, the feedback control signals can be selected by the user. The module has four control outputs for the polarization controller and the variable DGD source. The polarization controller can change the state of polarization (SOP) of the input signal to align the fast and slow axes of the variable DGD element with the slow and fast axes of the input signal distorted by PMD, and then the DGD value can be tuned to match the DGD value of the link. If we add a polarimeter in FIG. 38B (GP-PMDC-2) as the DOP monitor, using feedback control for the polarization controller (PC) and the variable DGD source, the DOP can be maximized to compensate PMD.

Figure 39A:
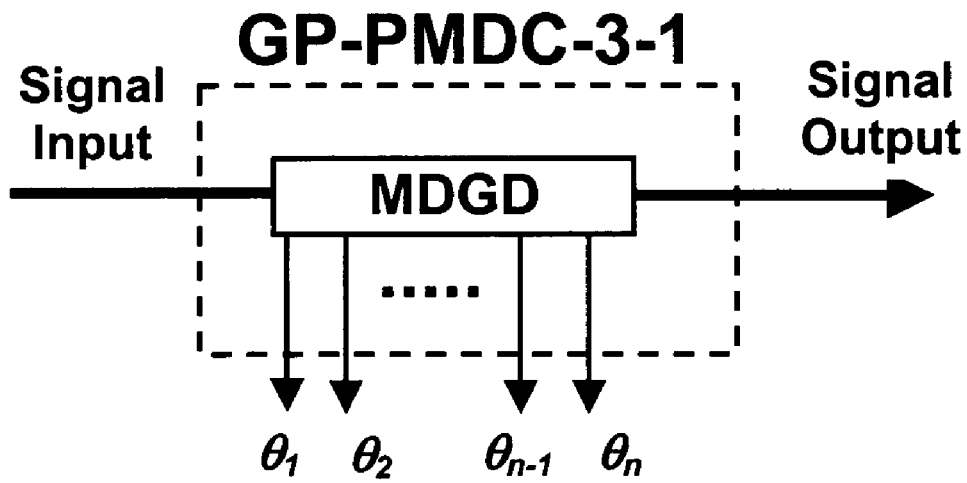
Figure 39B:
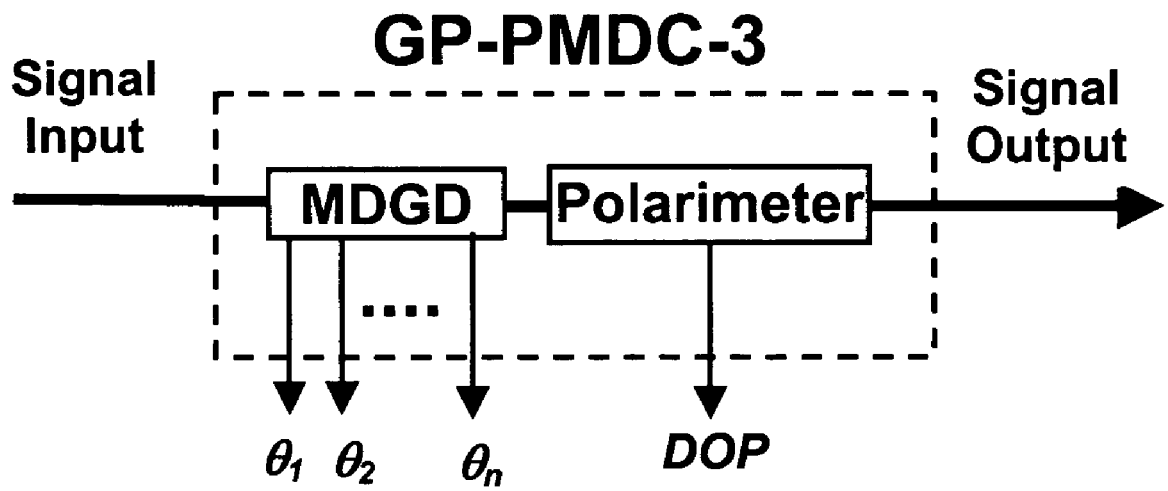

FIGS. 39A and 39B show two exemplary systems for compensating the higher-order PMD (GP-PMDC-3-1 and GP-PMDC-3). There are many polarization-control (or rotating) elements inside the multi-section DGD (MDGD) that can change the polarization coupling between each piece of DGD element, thus the total average PMD of the compensator (MDGD) can be changed to compensate the higher-order PMD along the link, not only first-order. The feedback signal is customer-based in GP-PMDC-3-1, while DOP monitor feedback using polarimeter is applied in GP-PMDC-3. In addition, these two modules (GP-PMDC-2-1 and GP-PMDC-2) can be used for higher-order PMD compensation since 3 DOFs are available. When GP-PMDC-2-1 or GP-PMDC-2 is combined with polarization scrambler (GP-PS) at the transmitter, the module can get the instantaneous DGD information to facilitate PMD compensation.

Figure 40A:
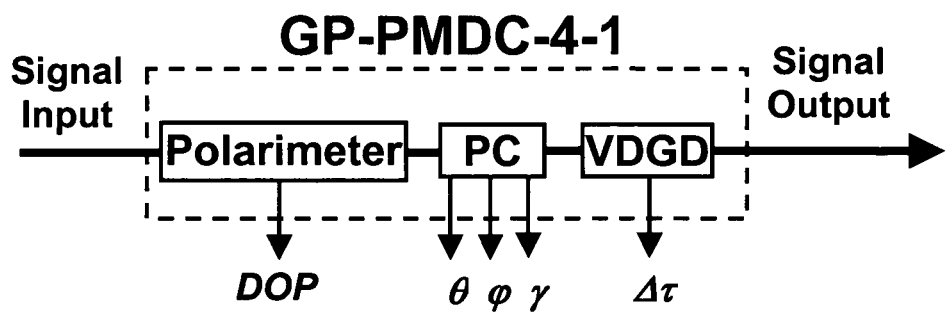
Figure 40B:
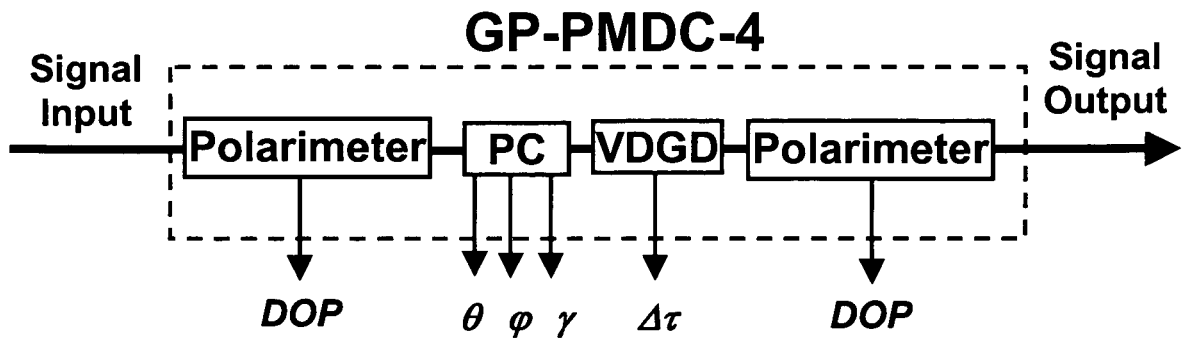

FIGS. 40A and 40B show first-order PMD compensation modules with pre-monitor based on the above feedback control. In order to monitor the exact PMD of the link itself, the polarimeter may be placed before the PMDC. When the polarization scrambler (GP-PS) is used at the transmitter, the polarimeter here (GP-PMDC-4-1) can monitor the instantaneous DGD value so that the variable DGD value can be set easily. The polarization controller can be dynamically controlled by other feedback signal from the receiver end. As same as GP-PMDC-4-1, GP-PMDC-4 uses the first polarimeter to get the DGD information and to set the variable DGD value, then the polarization controller can be feedback controlled by the second polarimeter that provides the compensated (maximized) DOP information.

Figure 41A:
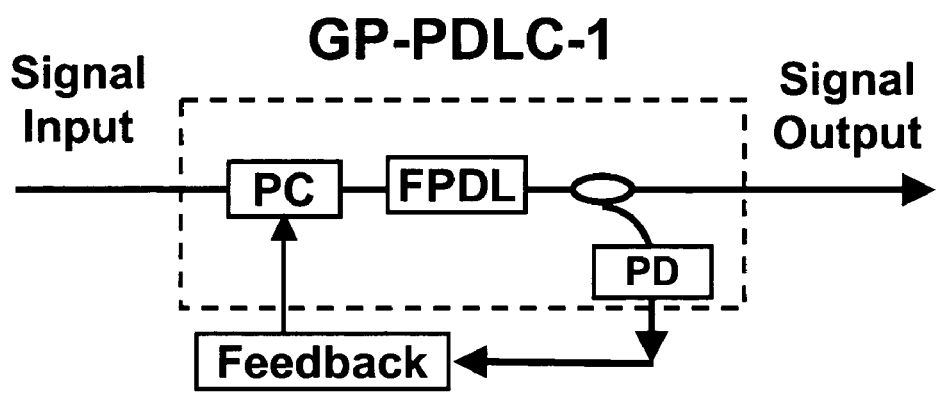

FIG. 41A shows a PDL compensation module that includes a polarization controller followed by a fixed PDL element. Although this kind of PDL compensator may not cancel exactly the existed PDL along the link or through some optical components, it can decrease the system fluctuation due to PDL if a medium PDL element is used for compensation. The photodiode detector (PD) can measure the power fluctuation induced by PDL (including the compensator). Using this monitored power fluctuation as feedback to control the PC, we can minimize the power fluctuation and thus compensate the PDL.

Figure 41B:
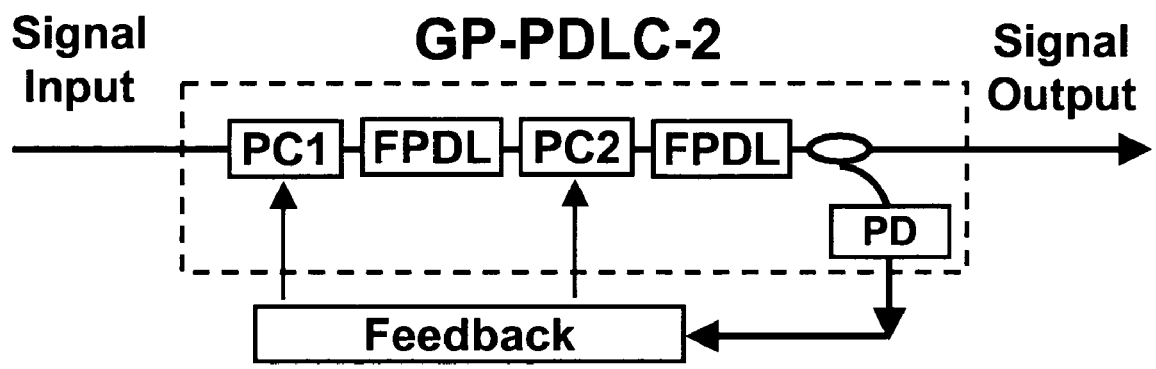

FIG. 41B shows that two cascaded fixed PDL elements (the corresponding PDL values are PDL1 and PDL2, respectively) can be connected with a polarization controller so that the total PDL of the compensator can be in the range of PDL1+PDL2 and the absolute value of PDL1-PDL2. This scheme can provide a variable PDL compensator using the same feedback described in FIG. 41A.

Figure 42A:
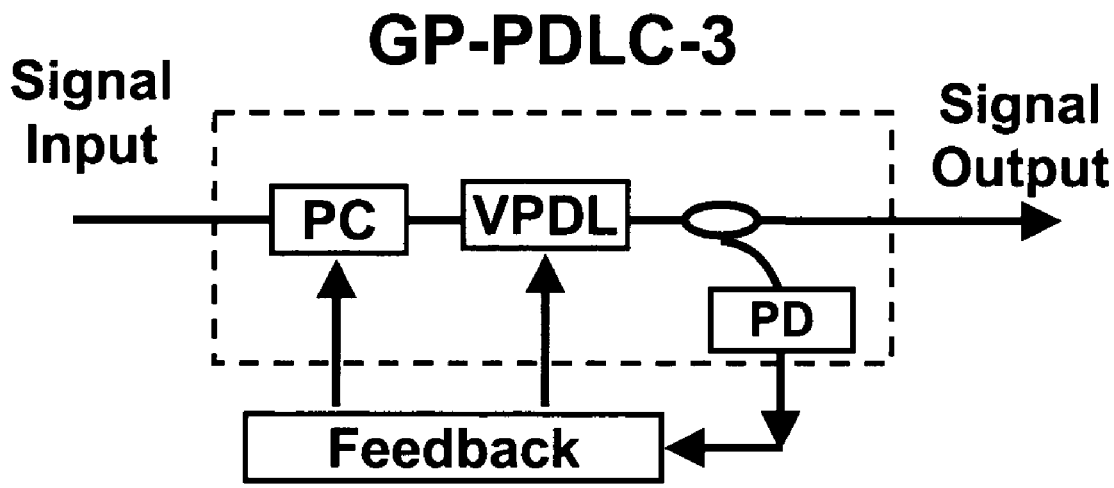
Figure 42B:
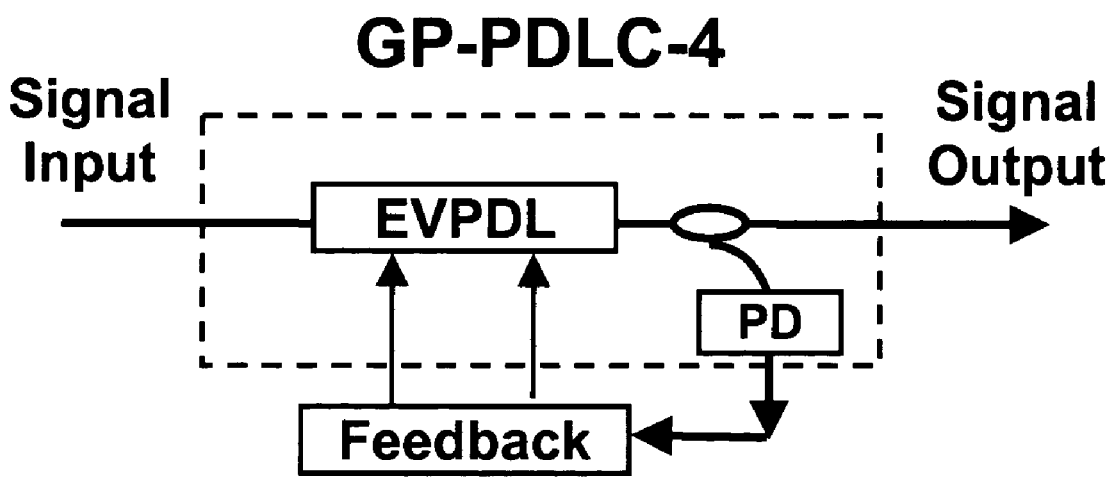

Instead of the fixed PDL source, if a single variable PDL source is applied, as shown in FIG. 42A, this module can be used for passive component PDL elimination or in-line PDL compensation. The same monitor and feedback algorithm are used here. FIG. 42B shows another kind of variable PDL compensator is using the electrically-controlled PDL source that can be used in dynamic applications. The module can provide interface for power fluctuation detection for feedback to control the PDL value and the input polarization.

Although the present disclosure only includes some examples and implementations, it is understood that various modifications and enhancements may be made without departing from the following claims.

What is claimed is:

1. A method for controlling polarization of light with a polarization controller which comprises a plurality of adjustable polarization elements, comprising:
   directing an input beam of light through the adjustable polarization elements of the polarization controller;
   measuring at least a portion of light transmitted through the polarization controller to produce a feedback signal;
   in response to the feedback signal, controlling the adjustable polarization elements of the polarization controller, one element at a time, to maximize or minimize the feedback signal, in order to control the polarization of the light transmitted through the polarization controller; and
   when an adjustable polarization element that is being adjusted operates near a limit of an operating range, adjusting the control of the adjustable polarization element to be away from the limit while adjusting other adjustable polarization elements, one at a time, to maximize or minimize the feedback signal until the adjustable polarization element is operated within a range that is away from an upper limit and an lower limit of the operating range without resetting any of the adjustable polarization elements in the polarization controller.

2. The method as in claim 1, wherein the controlling of the adjustable polarization elements comprises:
   dithering a control over each adjustable polarization element to determine a direction of an adjustment of the control which further maximizes or minimizes the feedback signal; and
   making an incremental adjustment in the control along the determined direction for each adjustable polarization element to further maximize or minimize the feedback signal.

3. The method as in claim 2, wherein the controlling of the adjustable polarization elements comprises;
   when the incremental adjustment in the control along the determined direction stops maximizing or minimizing the feedback signal, applying a different adjustment in the control along a direction opposite to the determined direction.

4. The method as in claim 1, further comprising:
   when each of the adjustable polarization elements is operated within a range that is away from the upper limit and the lower limit of the operating range, determining a difference between a current operating point of each of the adjustable polarization elements and a middle range operating point between the upper and lower limits;
   selecting an adjustable polarization element which has a largest difference between the current operating point and the middle range operating point between the upper and lower limits; and
   adjusting the control of the selected adjustable polarization element to operate closer to the middle range operating point while adjusting other adjustable polarization elements, one at a time, to maximize or minimize the feedback signal without resetting any of the adjustable polarization elements in the polarization controller.

5. The method as in claim 1, further comprising using a polarization controller which comprises six adjustable polarization elements as the polarization controller to control polarization of light.

6. The method as in claim 1, further comprising controlling the polarization of the light transmitted through the polarization controller to be stabilized in a selected polarization.

7. The method as in claim 1, further comprising controlling the polarization of the light transmitted through the polarization controller to compensate for an effect of a polarization mode dispersion in the light.

8. The method as in claim 1, further comprising controlling the polarization of the light transmitted through the polarization controller to reduce a polarization dependent loss.

9. The method as in claim 1, wherein the measuring of at least a portion of light transmitted through the polarization controller to produce a feedback signal comprises;
   detecting a portion of the light in a selected polarization to produce the feedback signal.

10. The method as in claim 9, further comprising using a partial polarization state generator to split the portion of the light in the selected polarization.

11. The method as in claim 1, further comprising:
    inserting an optical element in the optical path of the light transmitted through polarization controller to modify a property of the light prior to measurement of the portion of the light.

12. The method as in claim 11, wherein the inserted optical element causes at least a rotation of polarization of the light.

13. The method as in claim 11, wherein the inserted optical element causes at least a differential group delay in the light.

14. The method as in claim 11, wherein the inserted optical element an electro-optic modulator.

15. The method as in claim 11, wherein the inserted optical element causes at least a change in a polarization dependent loss in the light.

16. A device, comprising:
    a polarization controller which comprises a plurality of adjustable polarization elements along an optical path in series and operates to control polarization of light that transmits through the optical path, wherein each adjustable polarization element is adjustable in response to a control voltage to change the polarization of the light;
    a sensing unit to measure at least a portion of the light transmitted through the polarization controller and to produce a feedback signal from the measurement; and
    a feedback control which processes the feedback signal and responds to the feedback signal to control the adjustable polarization elements, one element at a time, to maximize or minimize the feedback signal without resetting any of the adjustable polarization elements in the polarization controller, wherein the feedback control is adapted to determine whether an adjustable polarization element that is being adjusted operates near a limit of an operating voltage range, and to adjust the control voltage of the adjustable polarization element to be away from the limit while adjusting other adjustable polarization elements, one at a time, to maximize or minimize the feedback signal until the adjustable polarization element is operated within a range that is away from an upper limit and an lower limit of the operating voltage range without resetting any of the adjustable polarization elements in the polarization controller.

17. The device as in claim 16, wherein the feedback control is further adapted to;

dither a control voltage over each adjustable polarization element to determine a direction of an adjustment of the control voltage which further maximizes or minimizes the feedback signal; and make an incremental adjustment in the control voltage along the determined direction for each adjustable polarization element to further maximize or minimize the feedback signal.

18. The device as in claim 17, wherein the feedback control is further adapted to;

when the incremental adjustment in the control voltage along the determined direction stops maximizing or minimizing the feedback signal, apply a different adjustment in the control voltage along a direction opposite to the determined direction.

19. The device as in claim 16, wherein the feedback control is further adapted to:

when each of the adjustable polarization elements is operated within a range that is away from the upper limit and the lower limit of the operating range, determine a difference between a current operating point of each of the adjustable polarization elements and a middle range operating point between the upper and lower limits;

select an adjustable polarization element which has a largest difference between the current operating point and the middle range operating point between the upper and lower limits; and adjust the control voltage of the selected adjustable polarization element to operate closer to the middle range operating point while adjusting other adjustable polarization elements, one at a time, to maximize or minimize the feedback signal without resetting any of the adjustable polarization elements in the polarization controller.

20. The device as in claim 16, wherein the polarization controller comprises six adjustable polarization elements.

* * * * *